(12) United States Patent
Czarnecki et al.

(10) Patent No.: US 12,158,475 B2
(45) Date of Patent: Dec. 3, 2024

(54) AUTOMATED SPECIMEN DEPOSITION SYSTEMS AND ASSOCIATED METHODS

(71) Applicants: NanoCytomics, LLC, Evanston, IL (US); Northwestern University, Evanston, IL (US)

(72) Inventors: Jarema Czarnecki, Evanston, IL (US); Justin Derbas, Evanston, IL (US); Sergey Rozhok, Evanston, IL (US); Hariharan Subramanian, Mundelein, IL (US); Parvathi Viswanathan, Evanston, IL (US)

(73) Assignees: NanoCytomics, LLC, Evanston, IL (US); Northwestern University, Evanston, IL (US)

( * ) Notice: Subject to any disclaimer, the term of this patent is extended or adjusted under 35 U.S.C. 154(b) by 0 days.

(21) Appl. No.: 18/164,918

(22) Filed: Feb. 6, 2023

(65) Prior Publication Data

US 2024/0027481 A1 Jan. 25, 2024

Related U.S. Application Data

(63) Continuation of application No. 17/751,127, filed on May 23, 2022, now Pat. No. 11,573,242, which is a
(Continued)

(51) Int. Cl.
*G01N 1/00* (2006.01)
*G01N 1/28* (2006.01)
(Continued)

(52) U.S. Cl.
CPC ..... *G01N 35/00029* (2013.01); *G01N 1/2813* (2013.01); *G01N 1/312* (2013.01);
(Continued)

(58) Field of Classification Search
None
See application file for complete search history.

(56) References Cited

U.S. PATENT DOCUMENTS

| 4,734,718 A | 3/1988 | Iwagami et al. |
| 5,059,393 A | 10/1991 | Quenin et al. |

(Continued)

FOREIGN PATENT DOCUMENTS

| EP | 0381308 | 8/1990 |
| EP | 1007937 | 10/2003 |

(Continued)

OTHER PUBLICATIONS

Extended European Search Report dated Nov. 9, 2018 for European Application No. EP 16777179.
(Continued)

*Primary Examiner* — Jyoti Nagpaul
(74) *Attorney, Agent, or Firm* — Perkins Coie LLP

(57) ABSTRACT

Systems and methods that enable automated spray deposition of biological specimens carried on microscope slides are described herein. Aspects of the technology are directed, for example, to automated specimen deposition systems and methods of generating high-quality, reproducible specimen-bearing microscope slides in automated processing systems.

16 Claims, 34 Drawing Sheets

Related U.S. Application Data continuation of application No. 15/092,153, filed on Apr. 6, 2016, now abandoned.

(60) Provisional application No. 62/143,698, filed on Apr. 6, 2015.

(51) Int. Cl.
  *G01N 1/31* (2006.01)
  *G01N 35/00* (2006.01)
  *G01N 35/10* (2006.01)

(52) U.S. Cl.
  CPC ..... *G01N 35/1011* (2013.01); *G01N 35/1065* (2013.01); *G01N 2001/317* (2013.01); *G01N 2035/00138* (2013.01); *G01N 2035/00168* (2013.01); *G01N 35/00871* (2013.01); *G01N 2035/00881* (2013.01)

(56) References Cited

U.S. PATENT DOCUMENTS

| | | |
|---|---|---|
| 5,256,571 A | 10/1993 | Hurley et al. |
| 5,425,918 A | 6/1995 | Healey et al. |
| 5,595,346 A | 1/1997 | Haruch et al. |
| 5,595,707 A | 1/1997 | Copeland et al. |
| 5,749,551 A | 5/1998 | Torres et al. |
| 5,952,239 A | 9/1999 | Hayes et al. |
| 6,918,309 B2 | 7/2005 | Brock et al. |
| 7,101,511 B2 | 9/2006 | Toi et al. |
| 7,468,161 B2 | 12/2008 | Reinhardt et al. |
| 7,470,541 B2 * | 12/2008 | Copeland ............ B01F 33/407 422/68.1 |
| 7,501,283 B2 | 3/2009 | Hersch et al. |
| 7,578,206 B2 | 8/2009 | Brock et al. |
| 7,652,772 B2 | 1/2010 | Backman et al. |
| 7,667,832 B2 | 2/2010 | Backman et al. |
| 7,800,746 B2 | 9/2010 | Backman et al. |
| 7,823,469 B2 | 11/2010 | Takaya et al. |
| 7,823,535 B2 | 11/2010 | Hanafusa et al. |
| 8,048,373 B2 | 11/2011 | Reinhardt et al. |
| 8,131,348 B2 | 3/2012 | Backman et al. |
| 8,735,075 B2 | 5/2014 | Backman et al. |
| 9,068,955 B2 | 6/2015 | Voss et al. |
| 9,091,620 B2 | 7/2015 | Yi |
| 9,261,524 B2 | 2/2016 | Von Beichmann et al. |
| 9,269,138 B2 | 2/2016 | Zahniser et al. |
| 9,778,273 B2 | 10/2017 | Feingold et al. |
| 9,778,276 B2 | 10/2017 | Farr et al. |
| 9,784,652 B2 | 10/2017 | Zahniser et al. |
| 2005/0019223 A1 | 1/2005 | Platt et al. |
| 2005/0232823 A1 | 10/2005 | Brock et al. |
| 2006/0111807 A1 | 5/2006 | Gothait et al. |
| 2006/0155178 A1 | 7/2006 | Backman et al. |
| 2009/0124519 A1 | 5/2009 | Platt et al. |
| 2009/0269799 A1 | 10/2009 | Winkelman et al. |
| 2010/0092683 A1 | 4/2010 | Ermantraut et al. |
| 2011/0136162 A1 | 6/2011 | Sun et al. |
| 2012/0116568 A1 | 5/2012 | Murphy et al. |
| 2012/0320365 A1 | 12/2012 | Bartko et al. |
| 2013/0089642 A1 | 4/2013 | Lipson et al. |
| 2013/0295597 A1 | 11/2013 | DeWitte et al. |
| 2015/0300929 A1 | 10/2015 | Kirk et al. |
| 2015/0374450 A1 | 12/2015 | Mansfield |
| 2016/0076978 A1 | 3/2016 | Dave et al. |
| 2016/0236409 A1 | 8/2016 | Armani |
| 2016/0291045 A1 | 10/2016 | Czarnecki et al. |
| 2016/0370264 A1 | 12/2016 | Campbell |
| 2017/0082585 A1 | 3/2017 | DeWitte et al. |
| 2022/0276268 A1 | 9/2022 | Mendoza et al. |

FOREIGN PATENT DOCUMENTS

| | | |
|---|---|---|
| EP | 1453600 | 9/2004 |
| EP | 1548448 | 6/2005 |
| EP | 1717571 | 11/2006 |
| EP | 1358012 | 8/2008 |
| EP | 1939631 | 4/2011 |
| EP | 2529237 | 12/2012 |
| EP | 2541257 | 1/2013 |
| EP | 1494808 | 7/2013 |
| EP | 2872869 | 5/2015 |
| EP | 2064557 | 9/2015 |
| EP | 2917715 | 9/2015 |
| EP | 2969177 | 1/2016 |
| EP | 1663847 | 11/2016 |
| EP | 3185016 | 6/2017 |
| JP | S63168562 | 7/1988 |
| JP | H06504115 | 5/1994 |
| JP | 2005046665 A | 2/2005 |
| JP | 2007064901 | 3/2007 |
| JP | 2012533745 A | 12/2012 |
| JP | 2013122462 | 6/2013 |
| JP | 5249905 | 7/2013 |
| WO | WO 01/88179 | 11/2001 |
| WO | WO 2007/069586 | 6/2007 |
| WO | WO 2008/034914 | 3/2008 |
| WO | WO 2010/078177 | 7/2010 |
| WO | WO 2014/074456 | 5/2014 |
| WO | WO 2014/143981 | 9/2014 |
| WO | WO 2015/109270 | 7/2015 |
| WO | WO 2016/164431 | 10/2016 |

OTHER PUBLICATIONS

PCT/US16/26174 International Search Report dated Jul. 1, 2016.
Remel Ethanol 95%. Available at: https://assets.thermofisher.com/TFS-Assets/LSG/manuals/IFU40132.pdf (Revised Feb. 9, 2010).
Webopedia: Cartridge definition, pp. 1-4.
Merriam Webster: definition of cartridge.
Your Dictionary: definition of vibrate.

* cited by examiner

25% ETHANOL + DEIONIZED WATER WITH SPRAY DEPOSITION

CYTOLYT WITH SPRAY DEPOSITION

CYTOLYT DILUTED 1:10 WITH PBS WITH SPRAY DEPOSITION

DEIONIZED WATER WITH SPRAY DEPOSITION

10% EtOH IN DEIONIZED WATER WITH SPRAY DEPOSITION

20% EtOH IN DEIONIZED WATER WITH SPRAY DEPOSITION

25% EtOH IN DEIONIZED WATER WITH SPRAY DEPOSITION

30% EtOH IN DEIONIZED WATER WITH SPRAY DEPOSITION

40% EtOH IN DEIONIZED WATER WITH SPRAY DEPOSITION

50% EtOH IN DEIONIZED WATER WITH SPRAY DEPOSITION

60% EtOH IN DEIONIZED WATER WITH SPRAY DEPOSITION

70% EtOH IN DEIONIZED WATER WITH SPRAY DEPOSITION

80% EtOH IN DEIONIZED WATER WITH SPRAY DEPOSITION

90% EtOH IN DEIONIZED WATER WITH SPRAY DEPOSITION

95% EtOH IN DEIONIZED WATER WITH SPRAY DEPOSITION

*100% EtOH IN DEIONIZED WATER WITH SPRAY DEPOSITION*

25% EtOH IN DEIONIZED WATER WITH SMEAR PREPARATION

LIQUID DROPLET PREPARATION

LIQUID DROPLET PREPARATION

LIQUID DROPLET PREPARATION

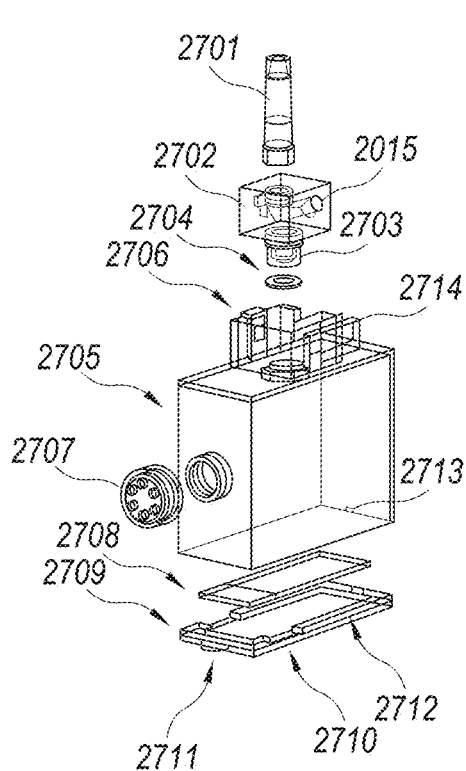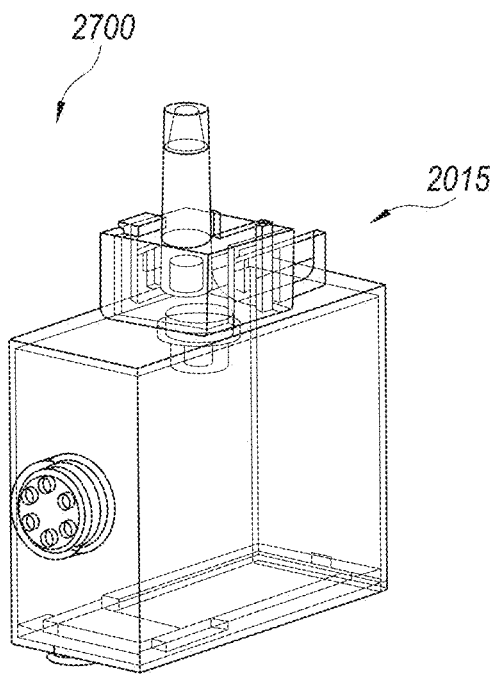
*Fig. 27A*  *Fig. 27B*
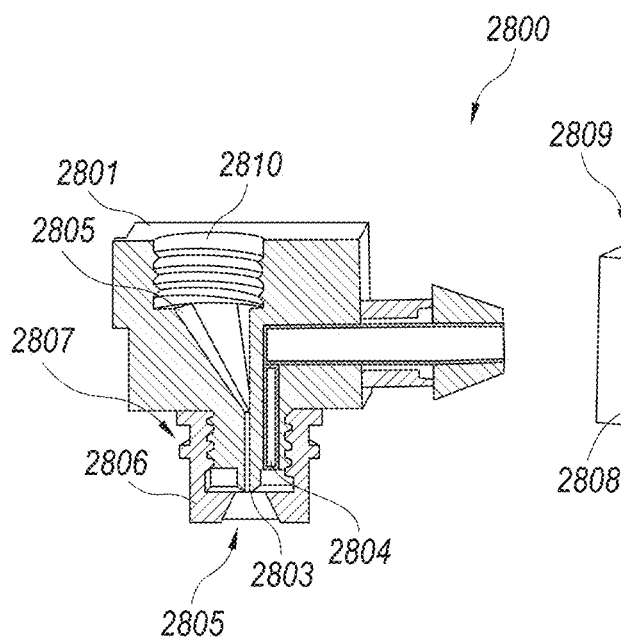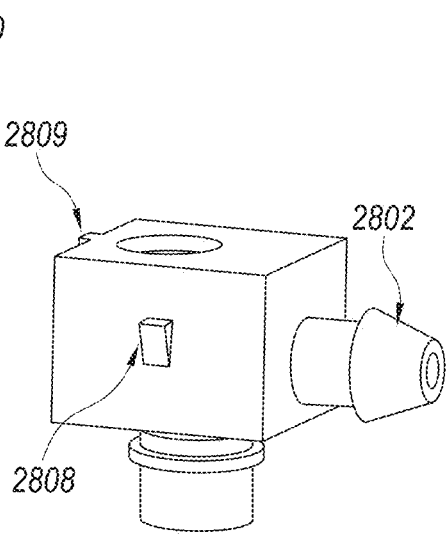
*Fig. 28A*  *Fig. 28B*

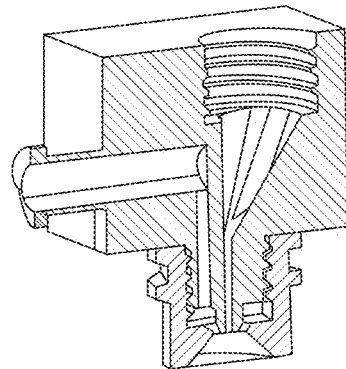
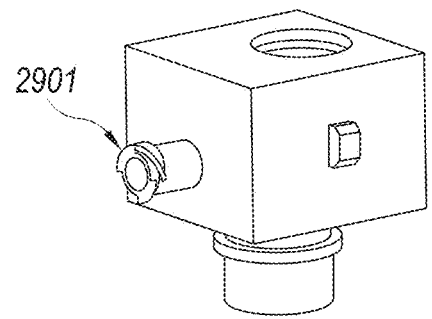
*Fig. 29A*   *Fig. 29B*
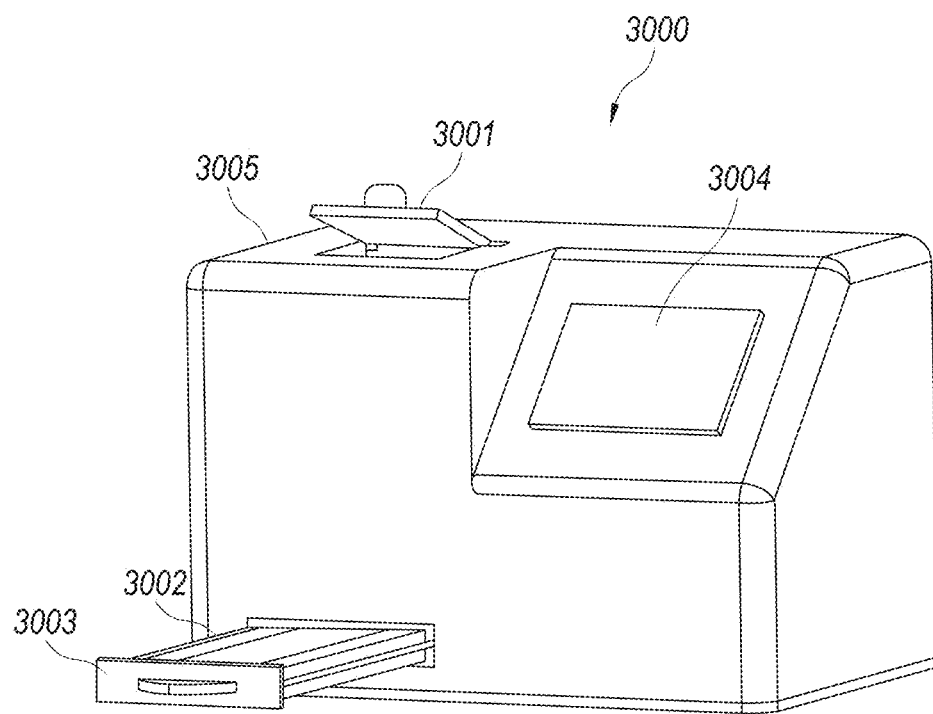
*Fig. 30*

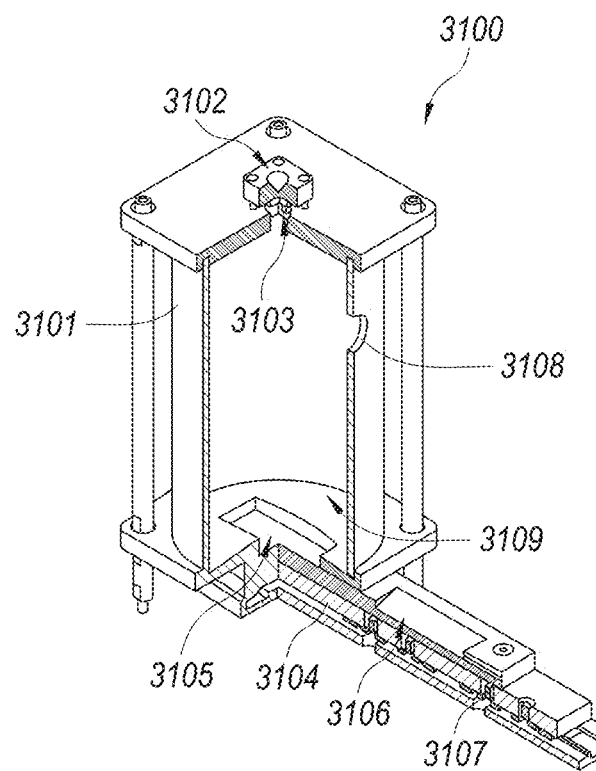
Fig. 31
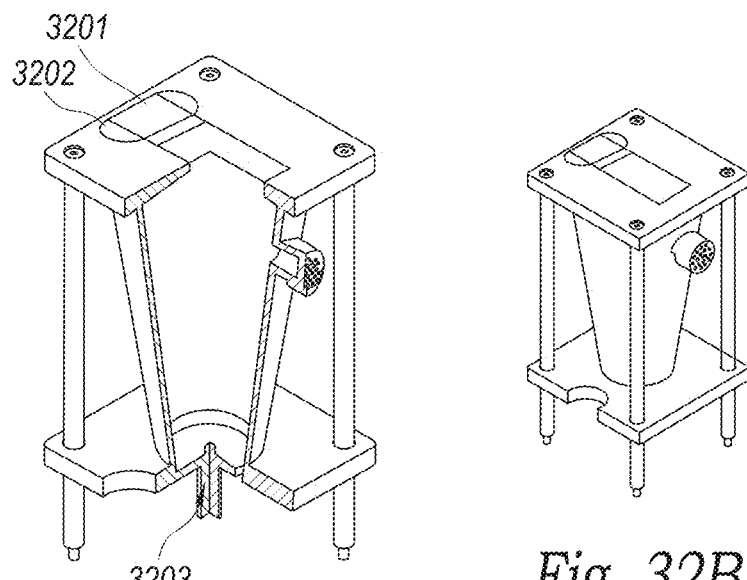
Fig. 32A
Fig. 32B

AUTOMATED SPECIMEN DEPOSITION SYSTEMS AND ASSOCIATED METHODS

PRIORITY CLAIM

This application is a continuation application of U.S. patent application Ser. No. 17/751,127 filed on May 23, 2022, which is a continuation of U.S. patent application No. Ser. No. 15/092,153 filed on Apr. 6, 2016, which claims priority to U.S. Provisional Patent Application Ser. No. 62/143,698, which was filed on Apr. 6, 2015, the entire contents of which are incorporated herein by reference and relied upon.

STATEMENT REGARDING FEDERAL FUNDING

This invention was made with government support under R44 CA168185, R01 EB016983, R01 CA155284, and R01 CA156186 awarded by the National Institutes of Health. The government has certain rights in the invention.

FIELD

The present technology provides systems, apparatuses and associated methods to achieve spray deposition of biological samples. In particular, provided herein are automated specimen deposition systems capable of providing biological tissue/cellular deposition on microscopic slides for tissue sample analysis and for clinical, diagnostic, and research applications thereof.

BACKGROUND

Biological tissue samples are collected from patients for microscopic and molecular diagnostic analysis for clinical, diagnostic and research applications. These samples are collected in a variety of laboratory, medical clinic and other health-care or medical research settings. For example, cells/tissue can be collected from a patient using a collection device, such as a brush, swab or cutting tool for biopsies and placed into liquid in a sample container. When ready to prepare microscopic slides for screening and/or diagnosis, the sample liquid is drawn by vacuum through a filter. A microscope slide is pressed against the filter to transfer cells onto the slide for viewing and analysis. Alternatively, the sample liquid may be transferred from the sample vial to a glass slide via a pipettor or other suction-type device. Other, non-liquid-based approaches for viewing cells under microscope include directly smearing cells or tissues onto the surface of the slide with the collection device.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure. Furthermore, components can be shown as transparent in certain views for clarity of illustration only and not to indicate that the illustrated component is necessarily transparent. For ease of reference, throughout this disclosure identical reference numbers may be used to identify identical or at least generally similar, analogous and/or complementary components or features.

FIG. 27A is an exploded view of a cartridge according to one embodiment of the invention and FIG. 27B is an isometric view of a cartridge according to one embodiment of the invention.

FIGS. 28A and B are isometric views of a nozzle component according to one embodiment.

FIGS. 29A and B are isometric views of a nozzle component according to one embodiment.

FIG. 30 is an isometric view of an automated system according to one embodiment.

FIG. 31 is an isometric view of a sample chamber according to one embodiment of the invention.

FIG. 32A is a section view and FIG. 32B is an isometric view of a sample chamber that sprays from bottom up according to one embodiment of the invention.

DETAILED DESCRIPTION

The present technology is directed to apparatuses, systems, and methods for collecting biological specimens and for generating specimen-bearing substrates. For example, certain embodiments achieve spray deposition of biological specimens on substrates for microscopy and other suitable molecular and imaging modalities of investigation. In particular, provided herein are automated specimen deposition systems capable of providing biological specimen (e.g., tissue, cells) deposition on slide substrates for specimen analysis and for clinical, diagnostic, and research applications thereof. Other embodiments provide for collection, maintenance, transport and/or deposition of biological specimens in a manner that facilitates preservation of cellular structural integrity of the specimens for generating high-quality, low-variability specimen-bearing substrates.

Conventional systems and techniques for preparing biological samples on slides have inherent limitations relating to the quality of the biological sample. For example, the slides prepared using the standard manual and/or current automated techniques discussed above, can be highly variable and present screening and diagnosis challenges that, in some instances, require obtaining additional samples from the patient.

Several embodiments of the present technology provide high-quality and low-variability specimen-bearing substrates (e.g., microscope slides) that can be utilized for generating efficacious measurements for clinical and research applications. For example, biological specimens can be deposited on substrates in a manner that preserves and presents natural cell molecular and structural characteristics for imaging and other analysis. These specimen-bearing substrates demonstrate high quality, undamaged, monolayers of isolated cells to provide consistent and accurate measurements and diagnostic outcomes. Embodiments disclosed herein further provide for automation of one or more aspects of achieving high-quality specimen-bearing substrates in a manner that requires minimal technician assistance, thereby limiting quality variability and increasing diagnostic reliability. In certain embodiments, an automated specimen deposition process for achieving high-quality specimen-bearing substrates can be optimized for specific cell types, cell concentration and/or liquid-based preservation solution.

Specific details of several embodiments of the technology are described below with reference to FIGS. 1-23D. Although many of the embodiments are described below with respect to devices, systems, and methods for generating high-quality specimen-bearing substrates, other applications and other embodiments in addition to those described herein are within the scope of the technology. Additionally, several other embodiments of the technology can have different configurations, components, or procedures than those described herein. A person of ordinary skill in the art, therefore, will accordingly understand that the technology can have other embodiments with additional elements, or the technology can have other embodiments without several of the features shown and described below with reference to FIGS. 1-23D.

As used herein, the term "automated" refers to a method (e.g., "automated process") in which one or more steps are performed without the need for operator intervention, or to a system or apparatus (e.g., "automated instrument") that performs one or more of its functions without operator intervention.

As used herein, the term "fully automated" refers to a system, apparatus, or method that includes the capability of not requiring an operator for steps following initial set-up, yet is capable of maintaining the quality of the system performance over a time period unmonitored or unattended by an operator. In particular embodiments, an operator provides a sample to a system or apparatus and/or initiates acquisition, and samples and/or analysis is generated without subsequent operator intervention.

Systems, devices and methods are provided herein for generating reproducible high-quality specimen-bearing substrates. In some embodiments, methods and systems are presented for automation of specimen deposition of clinical or research-obtained biological samples on substrates, such as microscope slides for obtaining cell/tissue images and/or other clinical or research data associated with the biological samples. In one embodiment, a specimen deposition system for depositing biological material onto one or more substrates includes a substrate processing area for receiving and holding one or more substrates. The system can also include a spray cartridge configured to orient and direct a spray of biological material from a specimen container towards a surface of a substrate, and a positioning assembly having one or more alignment assemblies configured to align the spray cartridge with respect to the surface of the substrate.

The present technology is also directed to automated specimen deposition systems for depositing a biological specimen onto one or more substrates. In one embodiment, an automated specimen deposition system can include a positioning assembly configured to align a specimen-containing spray cartridge with respect to a surface of a substrate. The system can also include a substrate loading station for sequentially receiving and carrying substrates and a controller communicatively coupled to the positioning assembly. In certain embodiments, the controller is programed to (a) command the positioning assembly to position and align the spray cartridge above the substrate loading station, and (b) command a compressed air source to direct compressed air into the spray cartridge in a manner that sprays the specimen from a nozzle on the spray cartridge towards a substrate carried by the substrate loading station.

Other aspects of the present technology are directed to methods of depositing biological specimens on substrates. In one embodiment the method can include delivering a plurality of containers holding biological specimens to a carrier assembly within an automated specimen deposition system. The method can also include moving the carrier assembly towards a positioning assembly of the deposition system and sequentially moving the containers from the carrier assembly to the positioning assembly. The method can further include moving the positioning assembly from a receive container configuration to an align container configuration to move the individual containers at the positioning assembly to an aligned position above a substrate processing area. The method can also include transporting individual substrates to the substrate processing area and spraying the biological specimen onto an upper surface of an individual substrate to generate a specimen-bearing substrate.

Further aspects of the present technology are directed to methods for collecting specimens for use in a specimen deposition system. In one embodiment, a method can include collecting biological material from a subject, and depositing the biological material in a transport solution carried by a container. In certain embodiments, the transport solution comprises between about 10% and about 95% ethanol. In various arrangements, the biological material collected from the subject can be suitable for generating specimen-bearing microscope slides for partial wave spectrometry analysis.

Figure 1:
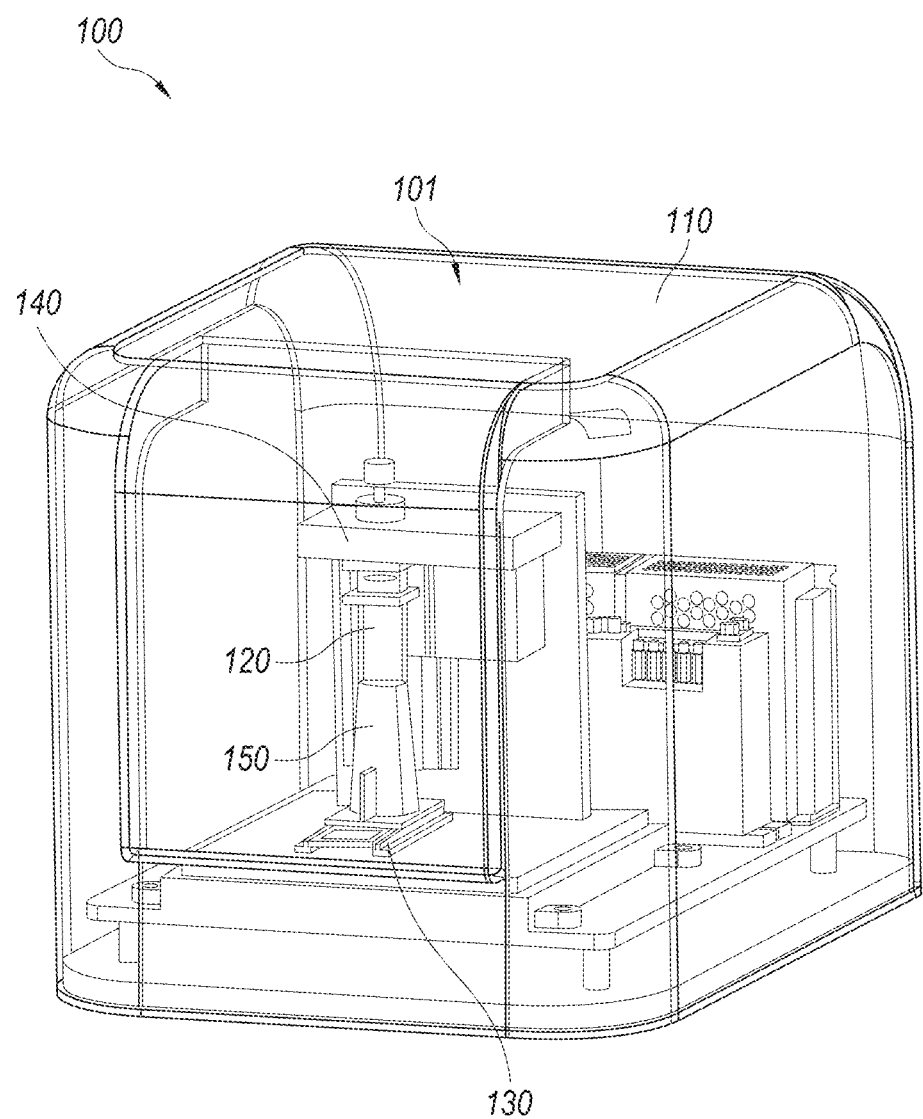
FIG. 1 is an isometric view schematically illustrating a specimen deposition system in accordance with an embodiment of the present technology.

FIG. 1 is an isometric view schematically illustrating an automated specimen deposition system 100 ("system 100") for generating specimen-bearing substrates from biological samples in accordance with an embodiment of the present technology. The system 100 can include a protective housing 110 (shown transparent) that creates an internal environment 101 enclosing (a) a spray cartridge 120 that orients and directs an aerosolized spray of biological material toward a substrate processing area 130, and (b) a spray positioning assembly 140 for aligning the spray of biological material from the spray cartridge 120 towards the substrate processing area 130.

The system 100 can automatically generate specimen-bearing substrates (e.g., slides) suitable for further processing. For example, specimen-bearing substrates generated using the technology disclosed herein are suitable for preparing specimens for microscopy, mass spectrometric methods, visual inspection, fluorescent visualization, microanalyses, imaging (e.g., digital imaging), or other analytical or imaging methods. For example, specimen-bearing substrates can undergo further processing including staining (e.g., H & E staining), antigen retrieval, or other types of protocols (e.g., immunohistochemistry, in situ hybridization, etc.). In some embodiments, the specimen-bearing substrates generated in accordance with the present technology are suitable for use for acquisition of partial wave spectroscopic (PWS) microscopic images and clinical, diagnostic, and research applications thereof. Examples of PWS apparatuses, systems, and methods of use thereof are described, for example, in U.S. Pat. Nos. 7,667,832; 7,800,746; 7,652,772; 8,131,348; U.S. Pat. App. Pub. No. 2012/0214880; U.S. Pat. App. Pub. No. 2008/0278713; U.S. Pat. App. Pub. No. 2008/0180664; and U.S. Pat. App. Pub. No. 2006/0155178; herein incorporated by reference in their entireties.

Figure 2:
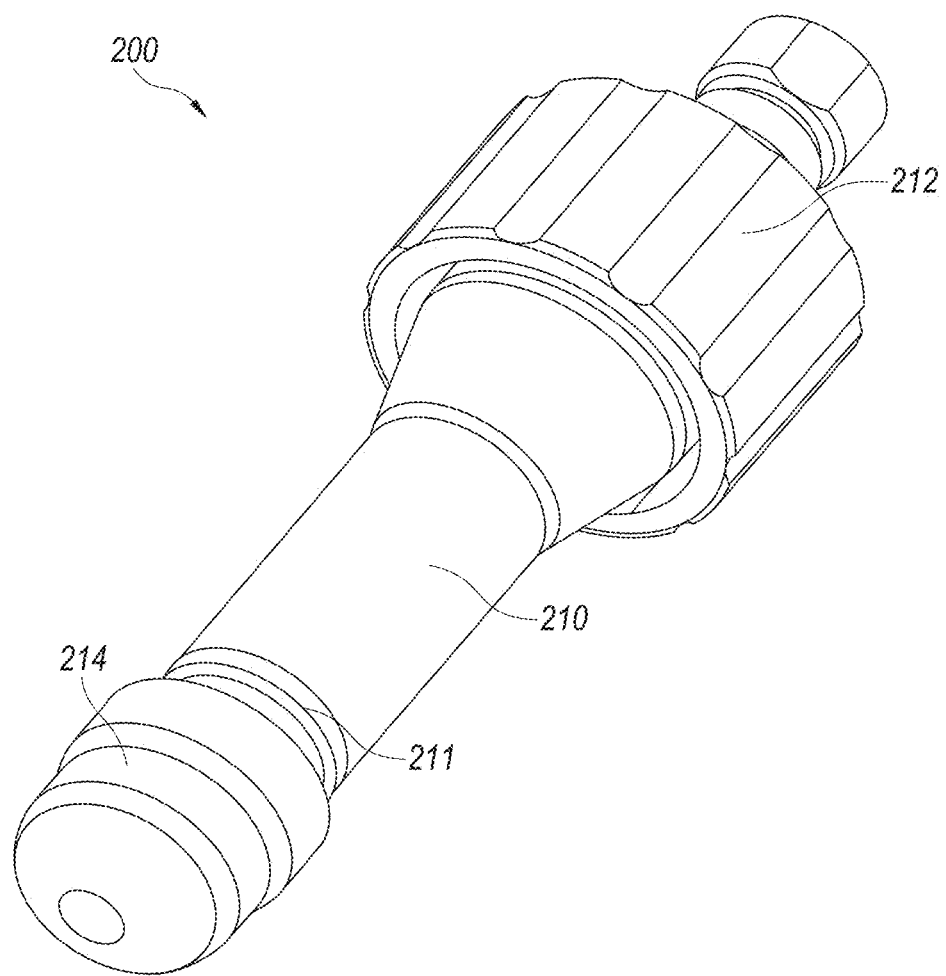
FIG. 2 is an isometric view of a specimen container in accordance with an embodiment of the present technology.

FIG. 2 is an isometric view of a specimen container 200 suitable for use in collecting and introducing biological specimens to the system 100 for spray deposition onto substrates. The specimen container 200 serves as a transport vessel for cell and tissue samples collected in a laboratory, clinical and/or research setting. As such, the specimen container 200 provides protection against leakage and/or contamination. As shown in FIG. 2, the specimen container 200 provides a vessel 210 for holding liquids (e.g., a transport solution) and biological matter, and an upper cap 212 for closing and sealing the contents in the vessel 210.

In various embodiments, the liquid (e.g., transport solution) can comprise ethanol (i.e., EtOH) or other liquid to preserve cell morphology and/or inhibit bacterial growth within the specimen container 200. In some embodiments, the liquid can comprise about 10% EtOH to about 95% EtOH, about 10% EtOH to about 90% EtOH, about 10% EtOH to about 85% EtOH, about 20% EtOH to about 70% EtOH, greater than about 10% EtOH, greater than about 20% EtOH, less than about 60% EtOH, about 20% EtOH, about 25% EtOH, about 30% EtOH, about 35% EtOH, about 40% EtOH, about 45% EtOH, or about 50% EtOH in deionized water. Other dilutions and/or liquids are also contemplated for use with specimen container 200.

Referring back to FIG. 2, the specimen container 200 further includes a lower cap 214 for sealing the lower septum of the vessel 210. In some embodiments, the upper and lower caps 212, 214 can include threads for mating with corresponding threads 211 provided on the vessel 210. In other embodiments, the upper and lower caps 212, 214 can be secured to the vessel 210 using other mechanical means known in the art, such as snaps, clasps, friction, adhesive, and the like. In some embodiments, gaskets, seals or other measures (not shown) to prevent leaks from the vessel 210 can be present. In some embodiments, the vessel 210 can include a penetrable upper seal element or membrane (not shown) in the form of a septum that can minimize, limit, or substantially prevent evaporation losses and or cross-contamination of the biological sample. Additionally the upper seal element can provide for a single-use access, or in another embodiment, a re-sealable access, to the internal contents of the vessel 210. Likewise, the vessel 210 can further include a penetrable lower seal element or membrane (not shown) in the form of a septum for providing a single-use or a multi-use (e.g., re-sealable) access to the internal contents of the vessel 210. Once the upper and/or lower caps 212, 214 are removed, the penetrable septums or membranes are exposed for accessing the internal contents of the vessel 210 (e.g., by penetration of a tube, nozzle, etc.). For example, the septums can be broken (e.g., pierced, torn, etc.) to access the contents of the specimen container 200. As described further below, the upper and lower septums can be broken to establish fluid communication with compressed air delivered via a pump or fluid line to evacuate at least portions of the specimen as a spray onto substrate(s).

Figure 5:
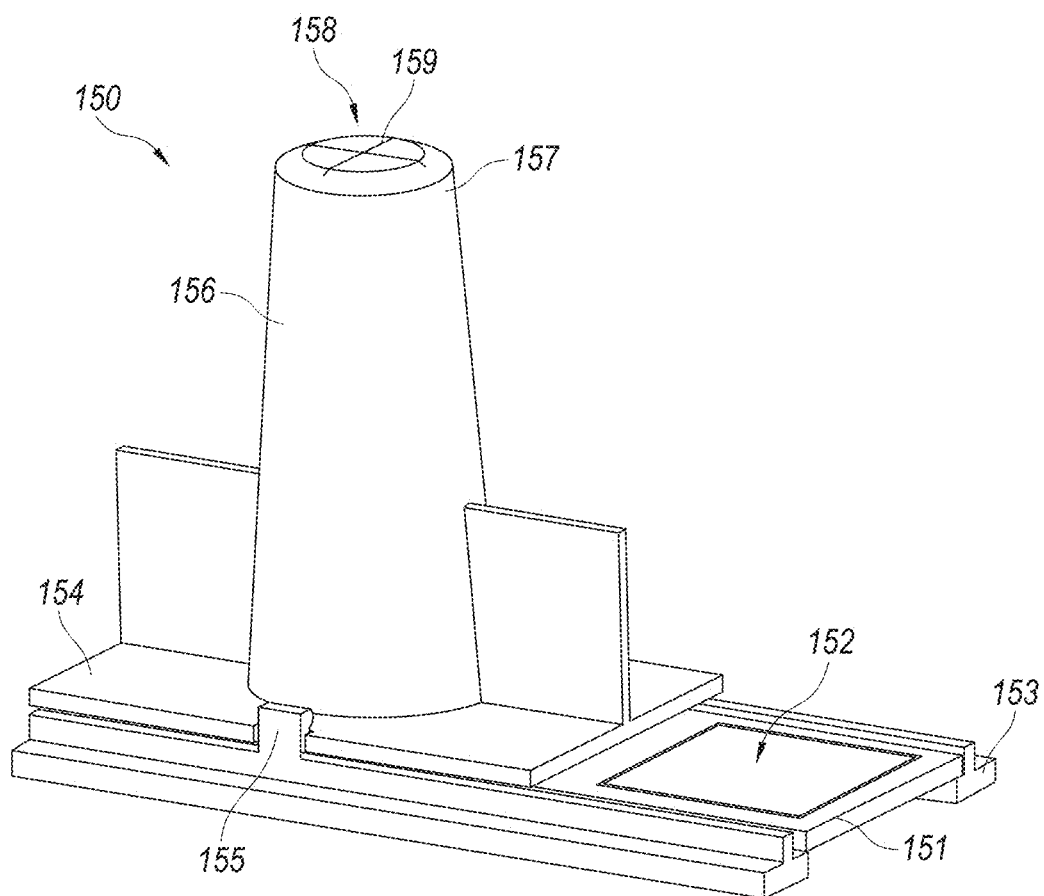
FIG. 5 is an isometric view of a substrate cartridge for use with the specimen deposition system of FIG. 1 and in accordance with an embodiment of the present technology.

In operation, a technician or other user can remove the upper cap 212 and penetrable upper septum, if necessary, and place liquids (e.g., transport solution) into the vessel 210. A biological specimen (e.g., a tissue biopsy, cell/tissue swab, cell/tissue scraping, etc.) can be deposited inside the vessel by dipping the collection device in the liquid such that the biological specimen is immersed and dispensed into the liquid. The penetrable upper septum and upper cap 212 can be sealed and/or secured on the upper portion of the vessel 210 and the specimen container 200 can be transported, for example, to the system 100. In some instances, the lower cap 216 can be removed in preparation for processing (e.g., deposition on a substrate). Following removal of the lower cap 214, the filled specimen container 200 can be received within the internal environment 101 and by the spray positioning assembly 140 (FIGS. 1 and 5). In some embodiments, a plurality of specimen containers can be received by the system 100 and loaded, for example, in a carrier assembly (e.g., a carousel, a rack, etc.; not shown) for sequentially moving the containers to the spray positioning assembly 140.

In some embodiments, all or portions of the specimen container 200 are disposable. In some instances, disposable can refer to all or certain components of the specimen container 200 being suitable for single-time use. In other embodiments, the specimen container 200 can be reused or used more than once (e.g., following cleaning and/or sterilization). In certain instances, portions of the specimen container 200 may not be disposable (e.g., the vessel 210, the caps 212, 216) while other portions are disposable and/or need to be replaced (e.g., penetrable upper and lower septums). The specimen container 200 can be made from a variety of materials such as plastics, metals, rubber, silicon, etc. The specimen containers 200 can further include, without limitation, one or more human-readable or machine readable label (e.g., a barcode that can be read and/or recorded by the system 100).

In various embodiments, the housing 110 inhibits, limits, or substantially prevents contaminants from entering the internal processing environment 101. Referring to FIGS. 1 and 3 together, the protective housing 110 can include a cover 112 that can be opened via an access door 114 (e.g., side swing door, up swinging door, slide panel, etc.) to access internal components, including, without limitation, robotic components (e.g., robotic arms), transport devices (e.g., conveyors, actuators, etc.), fluidic components, specimen deposition stations, substrate platforms, mixing components (e.g., vibrating or vortexing components), pressurization devices (e.g., air compressors and fluid lines, pumps, vacuums, etc.), dryers, controller and power systems, etc. In some embodiments, the housing 110 includes fluid access port(s) 116 for pressurized air, heated air, or other fluids provided from an outside source and/or for removing or otherwise exchanging air between the outside and the internal environment 101. The housing 110 may also inhibit, limit, or substantially prevent residual spray from contaminating an external environment surrounding the housing 110.

Figure 4:
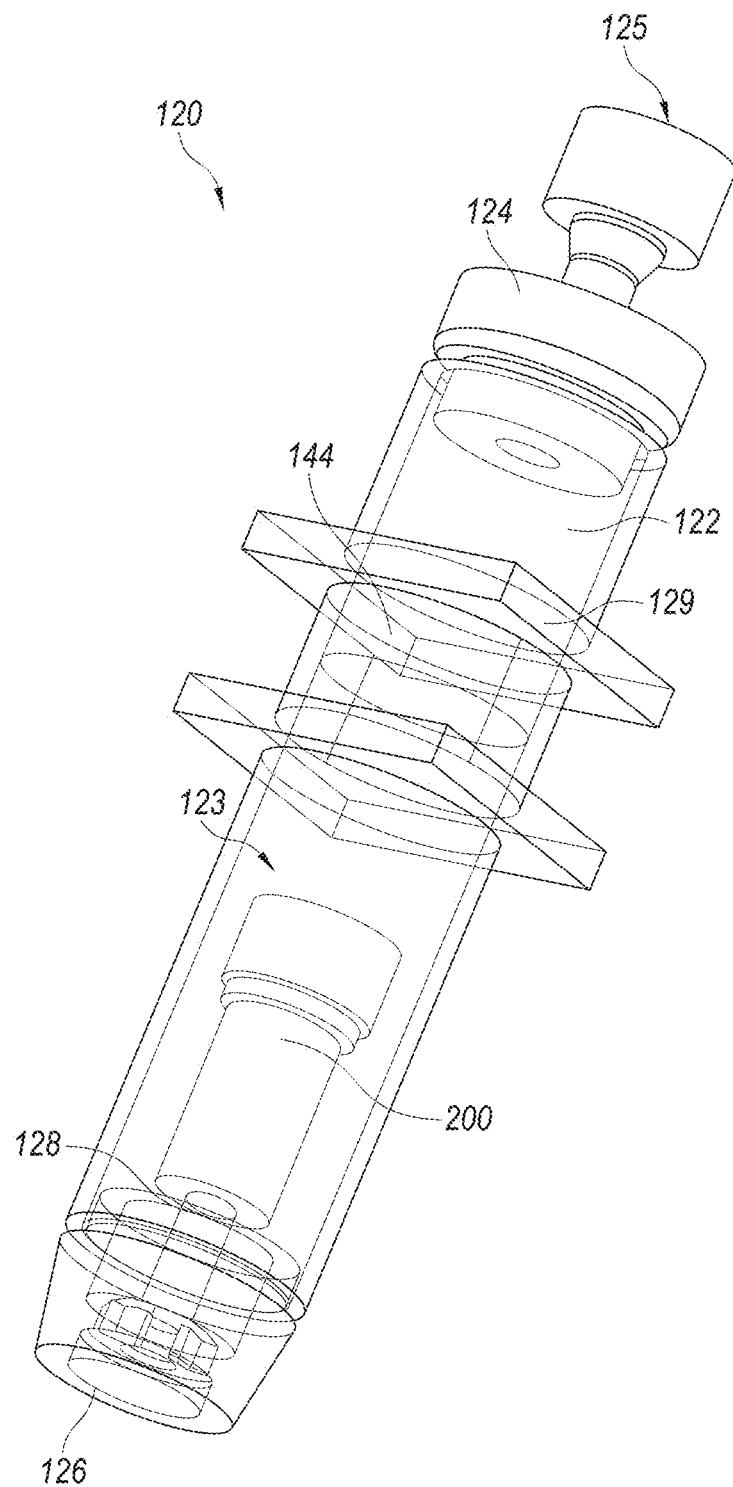
FIG. 4 is an isometric view of a spray cartridge for use with the specimen deposition system of FIG. 1 and in accordance with an embodiment of the present technology.

FIG. 4 is an isometric view of a spray cartridge 120 for use with the system 100 of FIG. 1 and configured to receive a specimen container, such as the specimen container 200 of FIG. 2 in accordance with an embodiment of the present technology. Referring to FIG. 4, the spray cartridge 120 includes an enclosure 122 for receiving and housing a specimen container 200 within the system 100 and during a deposition process. The enclosure 122 is shaped and sized to slideably receive the specimen container 200 (FIG. 2) and to secure the enclosure 122 with a head 124 providing a fluid-port 125 for coupling to an air-line and receiving compressed air. The spray cartridge 120 further includes a spray nozzle 126, and a puncture mechanism 128 for puncturing the penetrable lower septum of the specimen container 200 once engaged. The internal surface of the enclosure 122 may include channels, raised portions, grooves (not shown) or the like to position and/or align the specimen container 200 within the enclosure 122. The internal surface of the enclosure 122 may further include channels for the passage of compressed air around the specimen container 200 and through an air-nozzle adjacent and/or concentric to the spray nozzle 126. The high-pressure air-flow can result in aerosolization of liquid drawn from the spray nozzle 126. One or more retainers 129 can be integrally secured or otherwise attached to an outer surface 123 of the enclosure 122 for releasably securing the spray cartridge 120 to the spray positioning assembly 140, as described in further detail below. In some embodiments, the retainers 129 can be used to move the specimen container 200 from the carrier assembly (e.g., a carousel, a rack, etc.) to the spray positioning assembly 140 at or near the specimen processing area 130.

FIG. 5 is a substrate cartridge 150 for use with the system 100 of FIG. 1 and in accordance with an embodiment of the present technology. The substrate cartridge 150 is configured to retain one or more substrates 151 in a relatively horizontal or flat position. As shown in FIG. 5, the substrate cartridge 150 can enclose all or a portion of the substrate 151. For example, the substrate cartridge 150 can enclose at least the surface of substrate 151 selected for specimen deposition (e.g., portion of a slide separate from a label portion 152). In some embodiments, the substrate 151 rests in a lower housing 153 that reversibly receives and retains an upper housing 154 above the substrate 151 via clips 155 or other closure device known in the art. The lower housing 153, for example, can include one or more grippers, clamps or other retaining devices that releasably hold substrates 151 and/or the upper housing 154.

In some embodiments, the upper housing 154 has a spray retainer 156 that provides a protective chamber for containing the spray of biological material during the spray deposition process. The spray retainer 156 is provided with an upper opening 157 for receiving therein a lower portion of the spray cartridge 120 (e.g., to accommodate the spray nozzle 126 of the spray cartridge 120) such that the spray nozzle 126 is aligned over the surface of substrate 151 selected for specimen deposition. As illustrated in FIG. 5, the upper opening 157 of the spray retainer 156 includes a penetrable protective membrane 158 or other seal to protect the substrate 150 from contaminants and/or debris prior to and/or after spray deposition of biological material. The membrane 158 can include slits 159 or other openings that facilitate access to the spray retainer 156 by the spray cartridge 120. In one embodiment, the membrane 158 can be made of a rubber, silicon, or other conformable or malleable material that can conform to the inserted portions of the spray cartridge 120 and prevent back spray of biological material out of the spray retainer 156 during spray deposition.

As shown in FIG. 5, the spray retainer 156 slopes downwardly toward the surface of the substrate 151 and/or other drain reservoirs and has a shape (e.g., a frusto-conical shape) for promoting radially diverging flow. In some embodiments, the substrate cartridges 150 can have a waste well or other drain reservoirs (not shown) suitable to catch and retain overflow or overspray of biological material during the spray deposition process. In some embodiments, the inner wall of the spray retainer 156 has flow channels, groves, or other features that help over-spray liquid flow toward the drain reservoirs. The drain reservoirs, if present, can be provided for accumulating overflow spray or drips from the spray nozzle 126 of the spray cartridge 120 and to prevent unintended risk of cross-contamination between specimens. In certain embodiments, the substrate cartridge 150 is disposable following use. In other embodiments, the substrate cartridge 150 is suitable for sterilization and reuse.

In some embodiments, the system 100 can provide mechanisms for reducing the drying time of deposited liquid including, but not limited to, heating of surrounding air, heating of sample substrate, laminar flow of dry air over the wet substrate, etc. In additional embodiments, the system 100 can include sensors (e.g. optical) to monitor the drying of the wet substrate. Other embodiments can also include means to increase the quantity of cellular and/or tissue material on a sample slide through iterative deposition cycles with drying cycles between each deposition cycle. Such drying cycles can be performed with or without the various drying mechanisms discussed herein.

Figure 6:
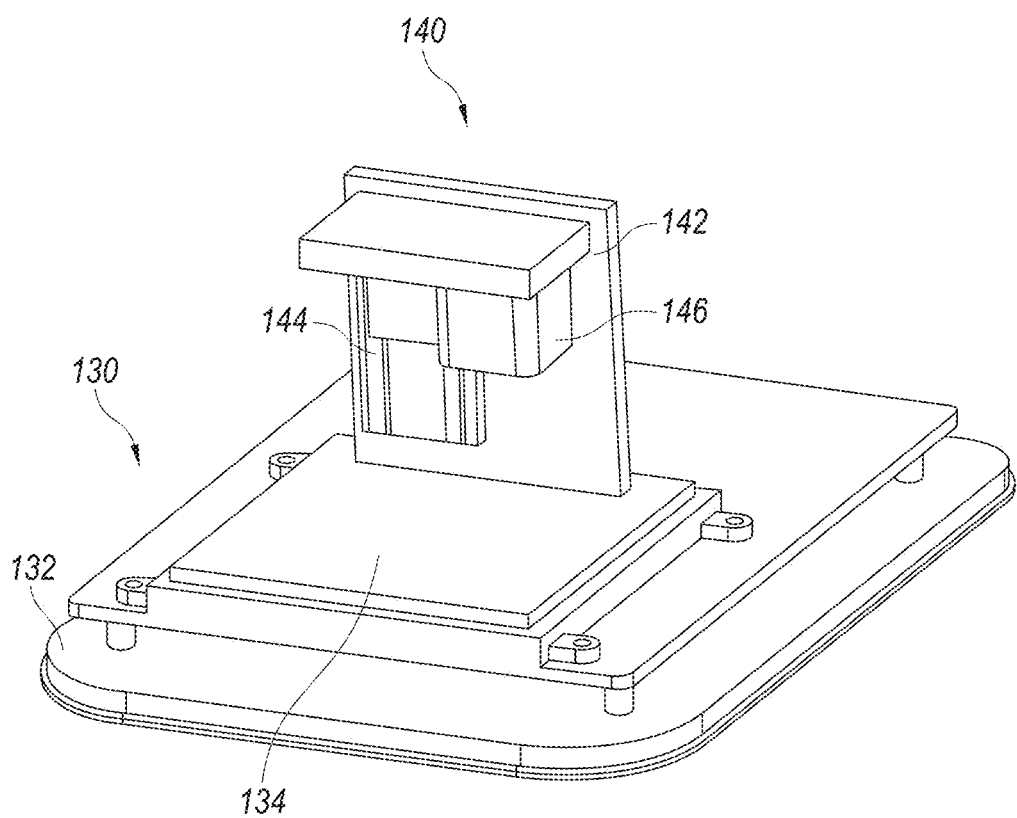
FIG. 6 is an isometric view of substrate processing area and spray positioning assembly for use with the specimen deposition system of FIG. 1 and in accordance with an embodiment of the present technology.

In some embodiments, the system 100 comprises automated hardware for fast and/or fully automated substrate processing such as spray deposition of biological material on substrates. In particular, the system 100 can include electronic stages, platforms and transport carriers for automated generation of specimen-bearing substrates. FIG. 6 is an isometric view of the substrate processing area 130 and spray positioning assembly 140 for use with the system 100 of FIG. 1 and in accordance with an embodiment of the present technology.

Figure 3:
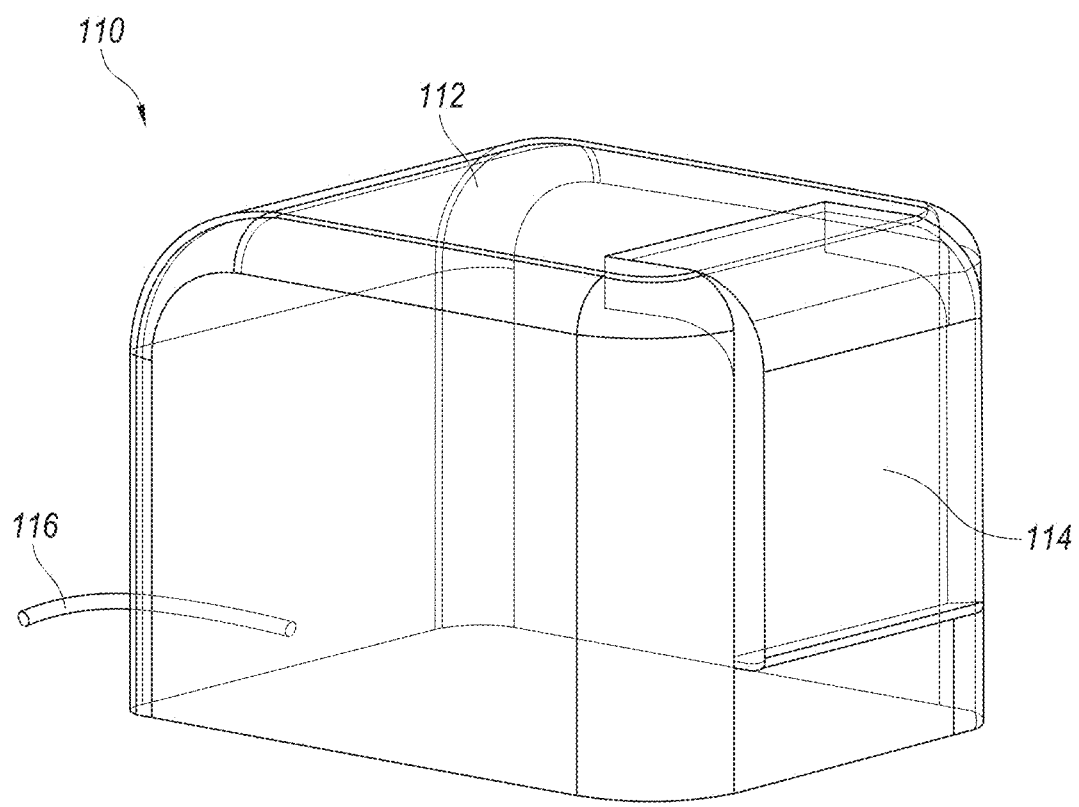
FIG. 3 is an isometric view schematically illustrating an enclosure for use with the specimen deposition system of FIG. 1 and in accordance with an embodiment of the present technology.

As shown in FIG. 6, the substrate processing area 130 can include a platform 132 accessible to the spray positioning assembly 140. In certain embodiments, the substrate processing area 130 can also include a substrate loading station 134 held by the platform 132 and configured to receive one or more substrates 151 or substrate cartridges 150 (FIG. 5) for depositing thereon sprayed biological material. In other embodiments, the platform 132 can serve as the substrate loading station. The loading station 134 is accessible via the access door 114 (FIG. 3) through which a user can load one or more substrate cartridges 150 (FIG. 5) housing unused (e.g., clean) substrates. Alternatively, substrate cartridges 150 (FIG. 5) can be automatically and/or sequentially transported to the substrate processing area 130 from a substrate staging device (not shown) that carries unused (e.g., clean, empty, etc.) substrates 151 and/or substrate cartridges 150 within the internal environment 101.

In some embodiments, the platform 132 can be securely positioned within the internal environment of the system 100 (e.g., anchored). In another embodiment, the platform 132 can be a moving platform that can be moved as an X-Y-Z transport system to facilitate both linear and vertical transport of carried substrates to/from various portions of the internal environment 101. For example, the substrate processing area 130 can include a motion system or actuator (not shown) that allows for movement of a substrate 151 (or substrate cartridge 150) relative to the other components (e.g., spray positioning assembly 140) of the system 100, the spray positioning assembly of the system relative to the substrate, or a combination thereof. In particular embodiments, a motion system can provide movement along the x-axis, y-axis, and/or z-axis, such that the loading station 134 can operatively move about a predetermined set of positions. In some embodiments, a motion system includes the loading station 134 that provides translational movement along a single axis (e.g., x-axis, y-axis, z-axis), for example by joining the loading station 134 to the platform 132 via a guide or linear bearing, such that the movement of the loading station 134 with respect to the platform 132 is restricted to translational motion along a single axis (e.g., x, y, z). In other embodiments, movement of the loading station 134 with respect to the platform 132 can occur along multiple or all axis (e.g., x-axis, y-axis, z-axis). In some embodiments, a guide allows movement via any suitable mechanism including, but not limited to, ball bearings, recirculating ball bearings, crossed roller ball, flexure, cylindrical sleeve, dovetail, etc. In some embodiments, movement along the guide is supplied by a linear actuator (e.g., motorize, pneumatic, hydraulic, Piezo, etc.).

Automation and/or high-throughput of the delivery of substrate cartridges 150 to and/or from the loading station 134 can be facilitated by linear guide carriages, linear motion actuator systems (not shown), motors (e.g., drive motors, stepper motors, etc.), drive elements (e.g., chains, belts, etc.), or other features for providing motion in the system 100 for transporting components such as substrates 151 and specimen containers 200 within the internal environment 101. Following spray deposition of the biological material onto one or more substrates, a user can remove the substrate cartridge(s) 150 from the loading station 134 or other holding/processing station within the internal environment 101 via the access door 114.

Referring again to FIG. 6, and in one embodiment, the spray positioning assembly 140 includes one or more alignment assemblies 142 for (a) manipulating and delivering specimen containers 200 to the substrate processing area 130, (b) positioning the specimen containers 200 within spray cartridges 120, and (c) aligning the spray cartridges 120 with respect to the substrate processing area 130. The alignment assembly 142 can be positioned generally above the substrate processing area 130 and is configured to hold containers (e.g., spray cartridges, specimen containers, vials, or other vessels) in which biological material or other substances (e.g., wash fluids, etc.) are stored and/or mixed.

A mounting mechanism 144 is provided to couple the containers to the alignment assembly 142 (e.g., via the retainers 129 of the spray cartridge 120 shown in FIG. 4, via the upper cap 212 of the specimen container 200 shown in FIG. 2). The mounting mechanism 144 can include, without limitation, one or more mechanical grippers (e.g., clamps, jaws, pinchers, magnets, etc.), suction devices (e.g., suction cups, pumps, vacuum pumps, etc.), or other retention features that, for example, prevent dropping and/or positioning specimen containers 200 and/or spray cartridges 120 in a misaligned state. Sensors (e.g., pressure sensors, air pressure sensors, light sensors, etc.; not shown) can be associated with the mounting mechanism 144 to detect the presence and/or orientation of the respective containers.

In various arrangements, the alignment assemblies 142 can further be coupled to one or more drive mechanisms 146 to visually, mechanically, electro-mechanically, and/or opto-mechanically manipulate and deliver the specimen containers 200 and align the spray cartridge 120 with the substrate processing area 130. For example, a drive mechanism 146 (e.g., an actuator assembly) can be operatively coupled to one or more motors suitable for mixing, shaking or vortexing a specimen container 200 to mix the cell suspension within the vessel 210. The drive mechanism 146 can also be operatively coupled to and/or driven by one or more motors (e.g., stepper motor, servo motor, etc.) for (a) moving the specimen container 200 within the enclosure 122 of the spray cartridge 120 and toward the spray nozzle 126, and (b) providing force to facilitate penetration of the penetrable lower septum of the specimen container 200 by the puncture mechanism 128 (FIG. 4). In certain embodiments, the drive mechanism 146 can facilitate X-Y-Z positioning of the spray cartridge 120 with respect to the substrate processing area 130 such that the spray cartridge 120 may be both aligned and positioned to a specific deposition height (e.g., between about 0.1 and about 6 inches above) with respect the substrate 151. In other embodiments, and as described above, the platform 132 and/or loading station 134 can provide movement for the alignment and positioning of the spray cartridge 120 with respect to the substrate cartridge 150 and/or substrate 151.

In some embodiments, the drive mechanism 146 can further include one or more positioners (not shown) or other visually (including optically) identifiable feature for convenient identification and orientation of the alignment assembly 142 with respect to the substrate processing area 130. For example, pre-determined positions known by the controller (not shown) can be used to identify a misalignment between the spray nozzle 126 of the spray cartridge 120 and the receiving substrate, and a user can be immediately notified that the alignment assembly 142 is misaligned. In some embodiments, the spray positioning assembly 140 can sequentially receive specimen containers 200 from a carrier assembly holding a plurality of specimen containers. In some embodiments, the spray positioning assembly 140 can be moved from a receive container configuration to an align container configuration. For example, the spray positioning assembly 140, following the transition of a specimen container 200 from the carrier assembly to the mounting mechanism 144 of the spray positioning assembly, move and align the specimen container, there is room. In one embodiment, the spray positioning assembly 140 is configured to carry one or more spray cartridges 120. In certain embodiments, a row of alignment assemblies (not shown) can independently mix and spray biological material from specimen containers onto substrates held in the substrate processing area 130. In other embodiments, the substrate processing area 130 and/or the spray positioning assembly 140 can include, without limitation, one or more sensors, readers, heaters, dryers, or other components that facilitate specimen deposition and/or processing of specimen-bearing substrates. In some embodiments, the substrate processing area 130 can include a pressure sensor (not shown) or other sensor for detecting the presence of a substrate cartridge 150 on the loading station 134.

In some embodiments, software, code, or other executable instructions are provided to direct and/or control (e.g., along with a controller or processor) automated specimen deposition by the system 100. In some embodiments, automation and/or high-throughput software is incorporated into the system 100, and provides one or more of: specimen intake, spray deposition, specimen switching, substrate indexing, other specimen-bearing substrate processing, etc.

In some embodiments, one or more of the components of a specimen deposition system 100 are under the control of one or more electronic controllers or computer processors. In certain embodiments, components and processes that enhance specimen deposition and enable automation and/or high-throughput capacity are controlled by a processor. In some embodiments, a processor controls numerous components of a specimen deposition system 100 and coordinates their actions to achieve the desired/directed function. For example, in some embodiments, movement of one or more (e.g., all) of the drive mechanisms and/or motors is automated. In other embodiments, movement is controlled and/or directed by a processor within or in communication with the system 100. In some embodiments, movement is synchronized with other actions of the system 100. In some embodiments, coupling and/or synchronization of steps enhances the automation and speed of the process of obtaining high-quality specimen-bearing substrates.

Figure 26:
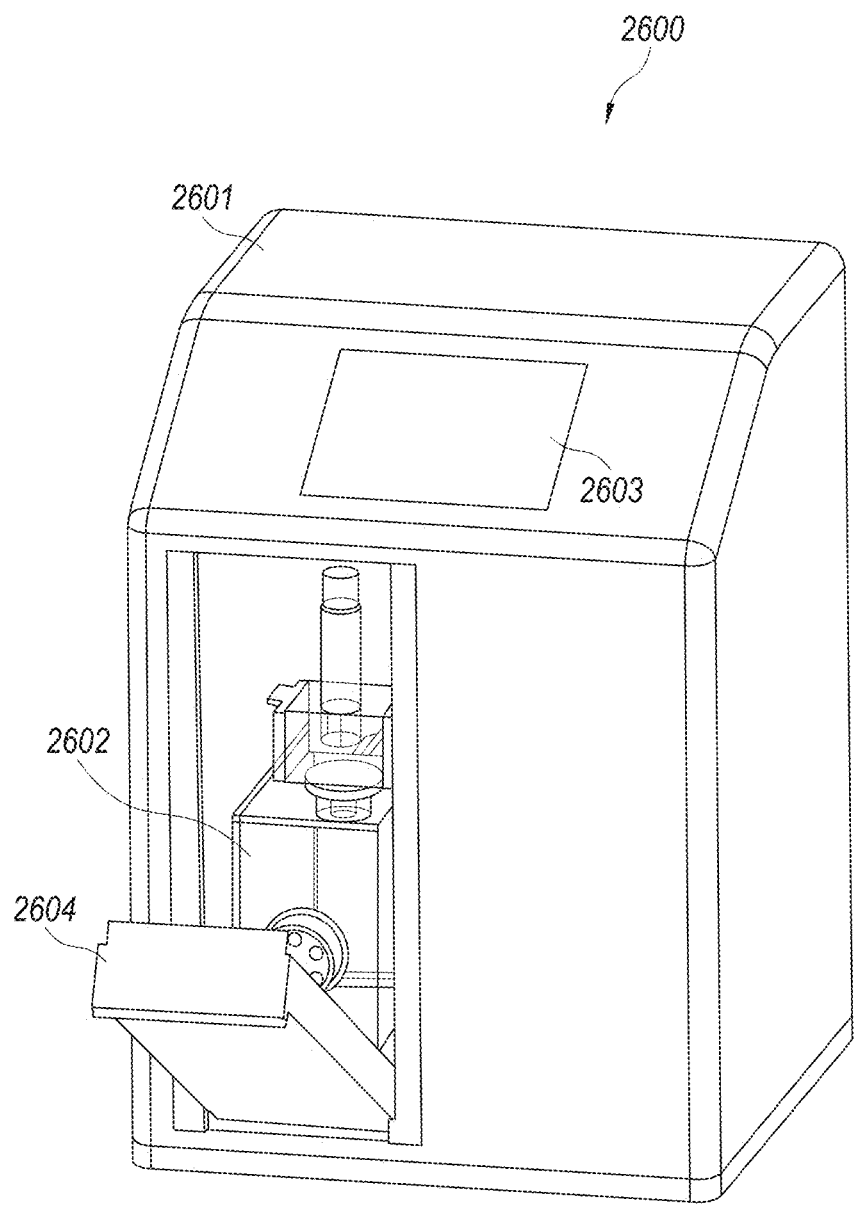
FIG. 26 is an isometric view schematically illustrating a portable automated specimen system for generating specimen-bearing substrates from biological samples in accordance with one embodiment.
Figure 33:
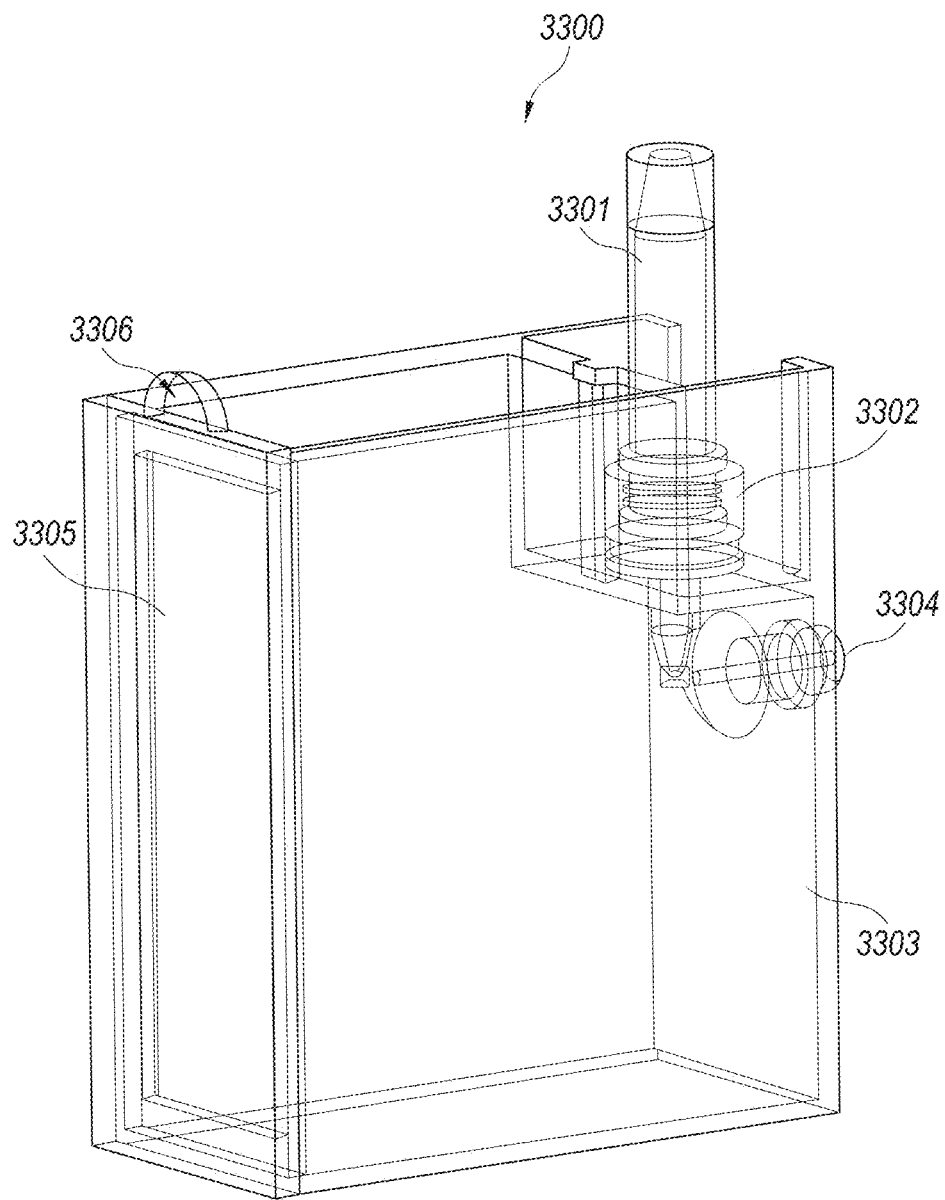
FIG. 33 is an isometric view of a sample container comprising a cartridge according to one embodiment of the invention.
Figure 34:
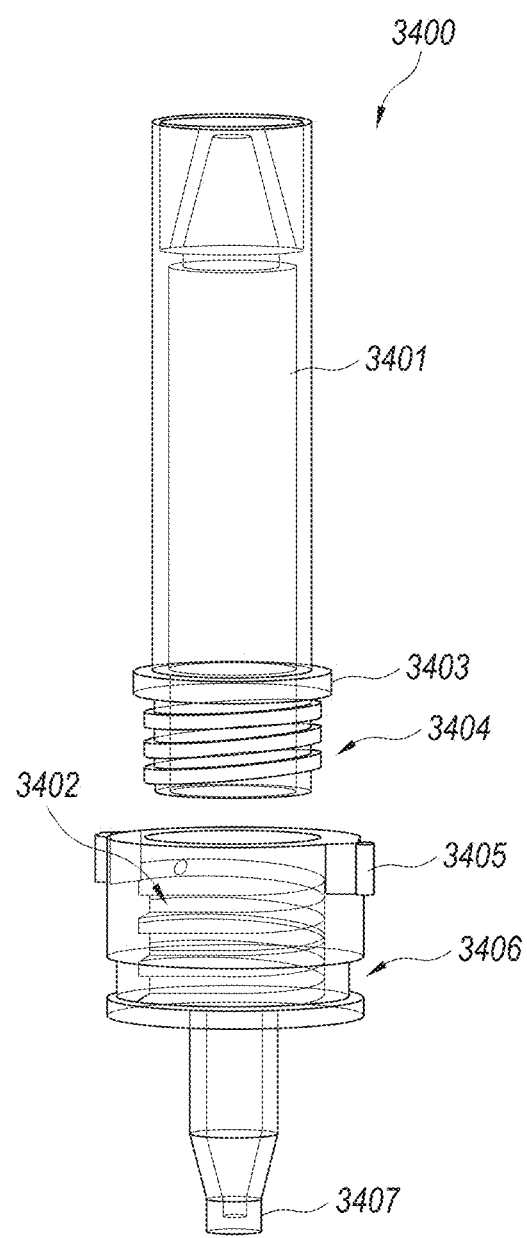
FIG. 34 is an isometric view of a nozzle according to one embodiment of the invention.

FIG. 26 shows a portable automated specimen system 2600 for generating specimen-bearing substrates from biological samples in accordance with one embodiment. In one embodiment, the system 2600 can include a protective housing 2601 that creates an internal environment for a cartridge 2602 that orients and directs deposition toward a substrate processing area. The system 2600 may have a display area 2603 or buttons for control. The system can comprise electronics, gas source, air valves, pressure meters, filters, a protection chamber and any accessories that pertain to the electronics and safety of the enclosure. The door 2604 to the housing can be opened automatically or manually and may be fit so that the opening and closing of the door releases the cartridge 2602. The door optionally can have extrusions on the inside to press the cartridge 2602 into the system 2600 during closure. The door 2604 can have a mechanism that pulls against extruded features on a side of the cartridge 2602 and releases the cartridge 2602 when opening the door 2604.

The system 2600 uses cartridges, optionally as illustrated in FIG. 27. The cartridge 2700 may be cleaned and reused or disposed of after each use. The cartridge 2700 is composed of several components. The sample container 2701 holds a proprietary solution. The sample container 2701 is used during sample collection to hold the collected sample during transport back to a processing lab or for use at the physician's office. The sample container 2701 can be screwed into nozzle component 2702. The sample container 2701 may undergo concentration and filtration steps before the sample is deposited onto a substrate. The sample may be mixed, vortexed, shaken, spun in order to prepare sample. In one embodiment, the nozzle component 2702 attaches to a secondary nozzle 2703. In one embodiment, the secondary nozzle fitting 2703 has an o-ring 2704 for sealing. The nozzle assembly comprising the assembly of the sample container 2701, nozzle component 2702 and secondary nozzle 2703 with o-ring 2704 snaps into a substrate cartridge 2705. A snap fitting 2706 can be provided to ensure that the nozzle component 2702 rests in place during use. In one embodiment, the cartridge 2700 has a filtered vent 2707 to allow for gas exchange while preventing contaminants from escaping. The substrate 2708 can be held in a holder 2709. The holder 2709 can have a recessed area that allows for easy removal of substrate 2710. In one embodiment, the holder 2709 has a tab 2711 for removing the holder 2709 from the cartridge 2700. The holder 2709 can optionally comprise one or more walls 2712 that, when inserted into the cartridge 2700, fit into the cartridge 2700 and help seal. The holder 2709 optionally can have a barrier, such as an o-ring, to increase sealing. The holder 2709 can have an extruded tab 2713 that fits into the substrate cartridge 2700. The holder 2709 can alternatively comprise a hinged design. To close the holder 2709, a snap-in feature near tab 2711 may also be used. The sample assembly, comprising the substrate 2708 placed into the sample holder 2709, may be attached to the substrate cartridge 2705 yielding a fully assembled cartridge 2015. The fully assembled cartridge 2015 may be assembled prior to inserting into the deposition system, for instance the portable deposition system as embodied in 2600.

The nozzle component 2801, illustrated in FIG. 28, can comprise a plurality of channels for both sample and air. In one embodiment, a cell concentrator component or sample filter (not shown) may be placed onto a sample container (not shown) before it is screwed into the nozzle component 2801. This would ensure that sufficient sample and clean samples are being deposited onto the substrate. The nozzle component 2801 can be composed of multiple sub-components that serve to operate as one assembly. The nozzle component 2801 can comprise a location for the sample container (not shown), a gas port 2802, an outlet for sample 2803 and an outlet for air 2804. The nozzle component 2801 may also have additional accessories in the sample container loading location 2810 such as one or more filters 2805 to prevent contamination of the substrate. The nozzle assembly 2800 may also comprise a secondary nozzle 2806. The secondary nozzle 2806 may be joined to the nozzle component 2801 by either a threaded feature or using adhesive, welding, etc. In one embodiment, the function of the secondary nozzle 2806 is to create sufficient concentric pressure around the sample outlet 2803 and to create a pattern of spray that produces a required result of uniformity of sample onto the substrate. The nozzle assembly 2800 inlets and outlets may have varying diameter and shaped openings to accommodate various applications. The geometry of the nozzle assembly 2800 may vary to limit material and to allow for fitting and decreased size. The secondary nozzle 2806 may have varying angle output to produce various spray patterns.

The secondary nozzle 2806 may comprise various angles of opening to allow for different spray patterns. The position of the secondary nozzle 2806 with respect to the nozzle component 2801 may be varied to change the concentric pressure profile. The nozzle component 2801 joined with the secondary nozzle 2806 may comprise a seal 2807 (e.g. o-ring) at the junction to prevent vapor from escaping during use. The nozzle component 2801 may comprise a snap-in feature 2808 that locks the assembly into a slide cartridge chamber (not shown). The nozzle component 2801 may also have a guide 2809 that helps orient the nozzle component 2801 into a substrate cartridge (not shown). In one embodiment, a sample container screws directly onto the nozzle component with threads 2810. The nozzle assembly 2800 joined with a sample container 2701, can be placed into a designated area of a substrate cartridge 2705 and held into place using one or more snap fittings 2706.

A cartridge assembly 2700 comprising a sample container 2701, nozzle assembly 2800, substrate cartridge 2705, sample substrate 2708, and substrate holder 2709 can be inserted into portable specimen system 2600 by opening the door 2604 into the spray chamber. The system 2600 may comprise a base on which the cartridge 2602 may be placed. Then, the cartridge 2602 is either pushed in until it the gas port 2802 mates with a gas source (not shown) or the act of closing the door pushes the cartridge in until the gas port 2802 mates with a gas source (not shown), and the cartridge 2602 is locked into place. In one embodiment, the gas port 2802 of the nozzle component 2801 will mate with a gas source (not shown) inside the system 2600. The system is activated from the user interface which may be a touch screen 2603 or panel with buttons (not shown) or a computer workstation (not shown). The system will then run and deliver a prepared substrate with deposited sample (not shown). The system will have a ready notification, by alarm, light, display or other notification. Following deposition, the cartridge 2602 may be removed either by opening the cartridge door 2604 causing the cartridge 2602 to be automatically released, by the press of a button (not shown) by the user to release the sample, or by a user manually pulling the cartridge 2602 out after opening the cartridge door 2604.

As shown in FIG. 29, the cartridge may also be designed to allow for use without an automated system where by a similar cartridge is made with connections 2901 for alternative pressure sources (not shown). One of these sources may be a pressure mechanism similar to a syringe (not shown). By depressing the syringe, a pressure would be created which would produce air flow and allow for deposition of the sample onto a substrate. In one embodiment, a portable pressure source (e.g. a gas cartridge) (not shown) may be used with a spray canister style mechanism. In one embodiment, a reusable trigger mechanism, which contains a gas source e.g. (air, $CO_2$, etc.,) (not shown) is connected to the nozzle component 2801 by a connector 2901. By pressing a trigger, the gas transfers the sample onto a substrate in a similar manner. The gas may be free of contamination. The portability of the device would allow it to be used in many areas where electricity may be limited or cause issues or it may be difficult to transport.

FIG. 30 illustrates an automated system 3000 that can comprise any feature described herein with respect to other systems or embodiments, for example system 2600. The internal components include a sample chamber, all valves, pumps, pressure controller, pressure sensors, fluid controllers, motors, electronics, etc. In use, the sample lid 3001 is opened and a sample container is loaded into the system. A sample substrate is loaded onto the slide holder 3002 which can be motorized. The slide holder 3002 can comprise a sealed door 3003 (with o-ring or other gasket). The user display 3004 can be used to run the system. The enclosure 3005 protects the system and provide aesthetics. Once the sample is deposited onto a slide, the sample chamber is cleaned. All pumps, sensors, valves, electronics, wiring, circuit boards, wash and waste containers are assembled with the system.

FIG. 31 shows a sample chamber 3100 according to one embodiment. The sample chamber comprises a containment chamber 3101 that limits or prevents contaminates from escaping. The sample chamber 3100 has a nozzle fitting 3102, the top which holds liquid sample and also has inlets for washing solution and air. The nozzle fitting 3102 has a secondary nozzle component 3103 that is fit onto the nozzle fitting 3102 to allow for specific spray patterns. Gas and liquid travel through the nozzle fitting 3102 and come out at the secondary nozzle component 3103. The components of the sample chamber 3100 may be metal or plastic. The components may also contain a hydrophobic coating to prevent sample from sticking to the components. The sample chamber 3100 optionally comprises a motor controlled stage 3104 that moves the slide area 3105 in and out of the sample chamber. The motor controlled stage 3104 comprises a vacuum controlled cleaning area 3106 that can be activated during cleaning. The sample chamber 3100 can be vacuum cleaned by suction 3107 after every deposition. Cleaning solution may be used. In one embodiment, the cleaning solution contains alcohol and/or detergents to remove contaminant. The sample chamber 3100 can comprise a filter 3108 for venting. The filter prevents contaminates from escaping while providing sufficient air exchange for deposition. The sample chamber 3106 can comprise a base 3109 comprising a lip with vacuum suction to prevent excess material from accumulating near the substrate area.

FIG. 32 shows a sample chamber 3200 according to another embodiment. In this embodiment, the sample chamber 3200 sprays from the bottom up. The sample chamber 3200 comprises a sample substrate 3201 which is configured to be placed on top instead of on the bottom. The sample chamber 3200 comprises an aperture 3202 to be able to contact ad stabilize the substrate. The sample chamber 3200 comprises a nozzle 3203 on the bottom of the device, opposite the substrate. Dimensions, in inches, are shown as examples, whereby the system may be designed for multiple dimensions depending on the application. The height may be varied per application. The system has similar components to that of FIG. 31.

FIG. 33 shows a cartridge 3300 according to one embodiment. According to this embodiment, the cartridge comprises a sample container 3301, a custom nozzle 3302, and substrate container 3303. The substrate container 3303 has a gas nozzle and gas port 3304. The gas nozzle sends gas across the custom nozzle 3302 resulting in aerosolization of the liquid sample. The substrate container 3303 comprises a substrate holder 3305 that acts to seal the substrate container. The substrate holder 3305 can comprise a tab 3306 to facilitate opening. The substrate container 3303 may have guides (not shown) to allow the substrate container 3303 to fit into a system, for example system 2600.

FIG. 34 shows a sample container assembly 3400 according to one embodiment. The sample container assembly generally comprises a sample container 3401 and a nozzle 3402. The sample container 3401 can be screwed onto a nozzle 3402 or otherwise attached. The nozzle 3402 may house a filter or alternative sample concentration or purification component that could be used in a centrifuge or alternative device. The nozzle 3402 may be of varying size to accommodate various applications. The nozzle 3402 may have a vent to the atmosphere in order to allow for various pressure conditions. The sample container 3401 can comprise an extruded ring 3403 to act as a stop. The sample container can comprise a threaded area shown as 3404. The nozzle 3402 can comprise a snap lock feature 3405 that allows the sample container assembly 3400 to click into a cartridge. The nozzle 3402 may comprise an area for a seal 3406, such as an o-ring. The nozzle may comprise a nozzle head 3407 having different lengths and different bore sizes to accommodate various materials. The sample container assembly 3400 can be inserted into a substrate cartridge as described herein. In one embodiment, when inserted into a substrate cartridge, the nozzle 3402 will line up in a path of gas spray. In one embodiment, the gas blows perpendicular to the plane of the sample spray plume. In one embodiment, the nozzle 3402 is perpendicular to the gas nozzle 3304.

Figure 7:
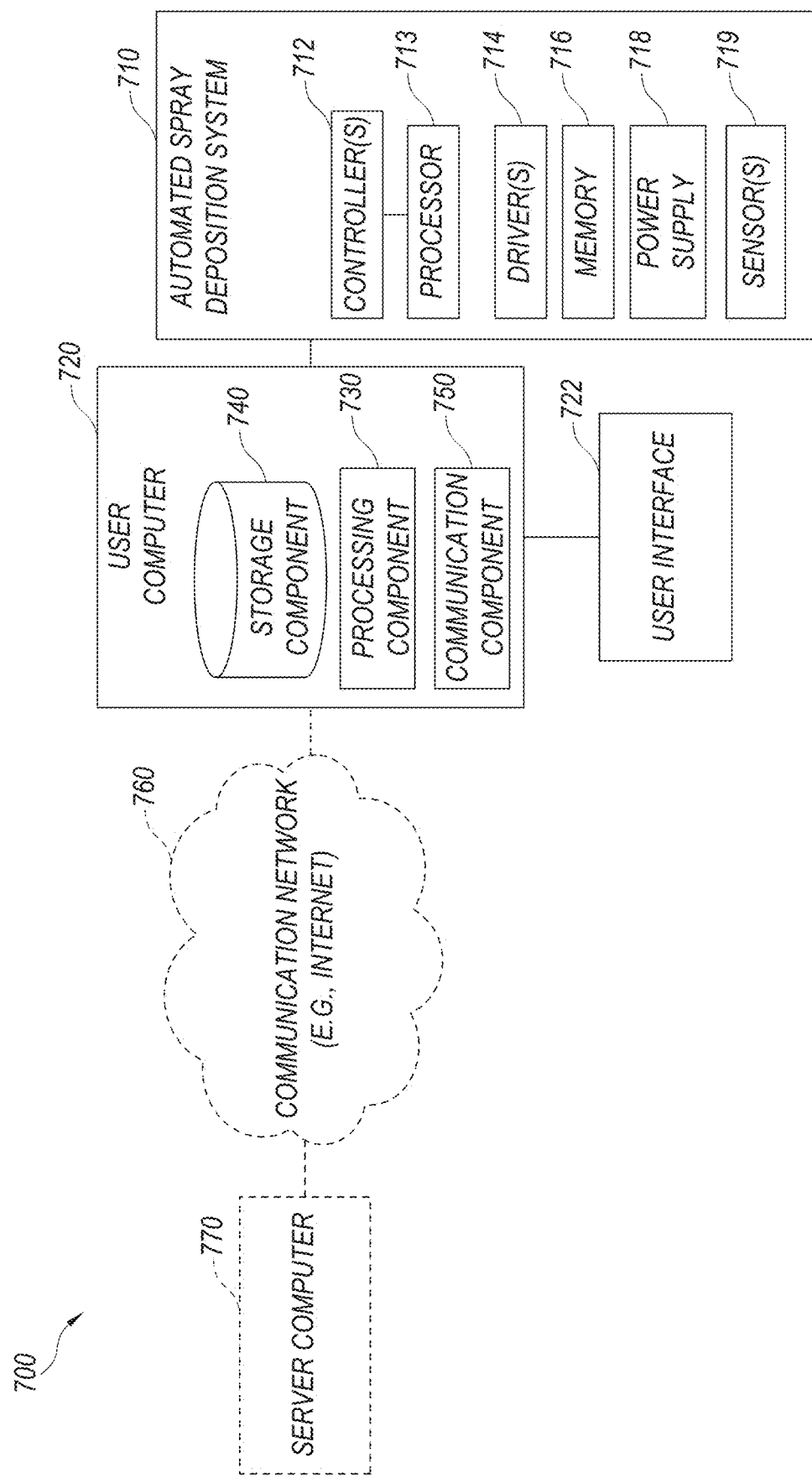
FIG. 7 is a schematic block diagram illustrating an automated specimen deposition system for generating specimen-bearing slides in accordance with embodiments of the present technology.

FIG. 7 is a schematic block diagram illustrating an automated specimen deposition system 710 for generating specimen-bearing substrates in a networked computing environment 700 in accordance with embodiments of the present technology. In some embodiments, the automated specimen deposition system 710 includes one or more controllers 712. A controller 712 can command system components and can generally include or be in communication with, without limitation, one or more computers 720, central processing units 730, processing devices, microprocessors, digital signal processors (DSPs), application-specific integrated circuits (ASICs), readers, and the like. To store information, the controller 712 can include or be in communication with, without limitation, one or more storage elements 740, such as volatile memory, non-volatile memory, read-only memory (ROM), random access memory (RAM), or the like. The stored information can include specimen deposition programs, optimization programs, calibration programs, indexing programs, mixing programs, or other executable programs. In one embodiment, a specimen deposition program can be chosen and executed based on cell type, cell concentration, fluid content, substrate properties, imaging requirements, etc. For example, varying spay deposition programs may account for varying spray volume and/or spray speed. Optimization programs can be executed to optimize performance of the system 700, such as for increasing productivity and/or enhancing deposition consistency. Specimen deposition may be optimized to, for example, increase the number of specimen-bearing substrates that are generated in a length of time, reducing the time of drying the substrates post-specimen deposition, reduce user handling of substrates, etc. In some embodiments, the controller 712 determines loading sequences for ordering or indexing the specimen containers and/or the generated specimen bearing substrates for tracking the source of the biological material on each substrate and/or reducing a need for user intervention. In some embodiments, this can save time because multiple specimen-bearing substrates can be generated from the same biological/specimen sample and/or different samples, and it reduces user error because the system 700 can accurately track specimen sources and link the specimen sources to accurately indexed specimen-bearing substrates.

Various embodiments of the present technology are further directed to automated control systems for sample processing. For example, some embodiments of the system 710 and/or computing environment 700 include modules for data acquisition, data maintenance, data retrieval for sample processing, such as information sharing of processing protocol and processing status via a communication component 750 and/or communication network 760. In certain embodiments, individual samples and/or multiple batch processing data, protocols and parameters can be uploaded to a remote server 770. Likewise, data relating to diagnostic features, real-time or adaptive capabilities for multiple batch processing and associated program processing parameters can be acquired, stored and later accessed.

The controller 712 (FIG. 7) can be configured to command drivers 714 to sequentially move and manipulate the components within the internal environment 101 of the system 100. In some embodiments, the controller 712 stores instructions in memory 716 and executes the instructions to command the spray positioning assembly 140 to sequentially mix, position and deploy, via pressurized air, biological material from specimen containers 200. Additionally or alternatively, memory 716 can store other processing instructions (e.g., substrate processing programs) that are executable by the controller 712 to command the drive mechanisms and other motorized and/or robotic components of the system 100 to process, move and/or store the specimen-bearing substrates. In certain embodiments, and as described further below, the processing instructions can be selected based on information obtained from the specimen to be deposited. The controller 712 can be communicatively coupled to any or all of the components of the system 100.

The controller 712 can receive information (e.g., look-up tables, temperature set points, duty cycles, power settings, environmental information such as ambient temperatures and/or humidity, processing protocols, etc.) from the memory 716. An input device 722 can be a manual input device (e.g., a keyboard, a touch screen, user interface, or the like) or an automated input device (e.g., a computer 720, a data storage device 740, servers 770, network 760, etc.) that can provide information automatically upon request from the controller 712. The memory 716 can store different instructions for different processes. One stored sequence of program instructions can be used to mix the specimen container 200 and another sequence of program instructions can be used to spray the biological material onto the surface of a substrate 151. The controller 712 can include a programmable processor 713 that executes the sequence of program instructions in order to sequentially generate specimen-bearing substrates. Any number of sequences of program instructions can be executed to perform different stages of a protocol.

A power source 718 of the controller 712 can be one or more of batteries, fuel cells, or the like. The power source 718 can also deliver electrical energy to other components of the system 100. In other embodiments, the power source 718 can be an AC power supply. The controller 712 can also collect information from a plurality of sensors 719 provided by the system 100. For example, the system 100 can include pressure sensors, contact/touch sensors (e.g., for measuring contact pressure between the spray cartridge 120 and the specimen container 200), temperature sensors, positions sensors (e.g., optical sensor, laser sensor, etc.), light sensors, air pressure sensors, motion sensors, electromechanical sensors, chemical sensors, and the like.

Referring to FIGS. 1-7 together, and in operation, a user can load substrate cartridges 150 carrying empty substrates 151 (e.g., clean microscope slides) onto the loading station 134 of FIG. 6. In some embodiments, the substrate cartridges 150 and/or the substrates 151 can be transferred to a reader (e.g., a label reader, a barcode reader, etc.), not shown, that reads labels, if any, on the substrates. Whether in an automatic manner or user-assisted, the substrate cartridges 150 can be delivered to the loading station 134 in position for deposition of biological material.

When engaged, the spray cartridge 120 (FIG. 4) can be configured to receive a specimen container 200 (FIG. 2) and be coupled to a compressed air source (e.g., via the air-port 125) that directs compressed air into a biological sample and/or around a biological sample, through a spray nozzle 126 of the spray cartridge and towards the loading station 134 holding unloaded substrates 151. Compressed air movement into, out of, and within the spray cartridge 120 and through the specimen container 200 can be controlled by an air pneumatics module that includes, for example, valves, pressure sensors, pumps, and filters. The pneumatics module can supply the pressurized air as well as generate vacuums to perform various spray deposition processing operations. The pneumatics module may also be used to provide laminar dry-air flow over specimen-bearing substrates to reduce drying time. In another example, a vacuum (not shown) can also be used to provide a negative-pressure air-flow into the housing 110 (FIG. 3) to limit or substantially prevent contamination of an external environment around the housing 110.

In certain high-throughput embodiments, a series of spray cartridges 120 with loaded specimen containers 200 can used sequentially (or in tandem) to deposit biological material onto substrates 151. For example, in one embodiment, a carousel (not shown) can provide a series of spray cartridges 120 that can be rotated (e.g., via the drive mechanism 146) to position each spray cartridge 120, one or more at a time, above the substrate processing area 130.

In some embodiments, the substrate cartridges 150 and/or substrates 151 can receive additional processing steps in the loading station 134 or other processing station (not shown) in the system 100, such as heating (e.g., with a dehydration unit, a heating unit, a baking module, or other component capable of removing liquid from the slides), staining, hybridizing, washing, or for receiving coverslips or the like. In some embodiments, an air system can partially recirculate air to control the humidity in the internal environment 101. In other embodiments, drying, adding coverslips and/or other processing steps (e.g., staining, etc.) can occur manually and/or as post-deposition processing steps occurring outside of the internal environment 101 of the system 100. In some embodiments, the substrate 151 can remain housed in the substrate cartridge 150 during all or some additional processing steps. Once processing within the substrate cartridge 150 is complete, the substrate 151 bearing the spray-deposited specimen can be removed from the substrate cartridge by separating the lower and upper housing 153, 154 components via opening a hinged mechanism or disengaging one or more clips 155 securing the substrate cartridge 150.

Figure 8:
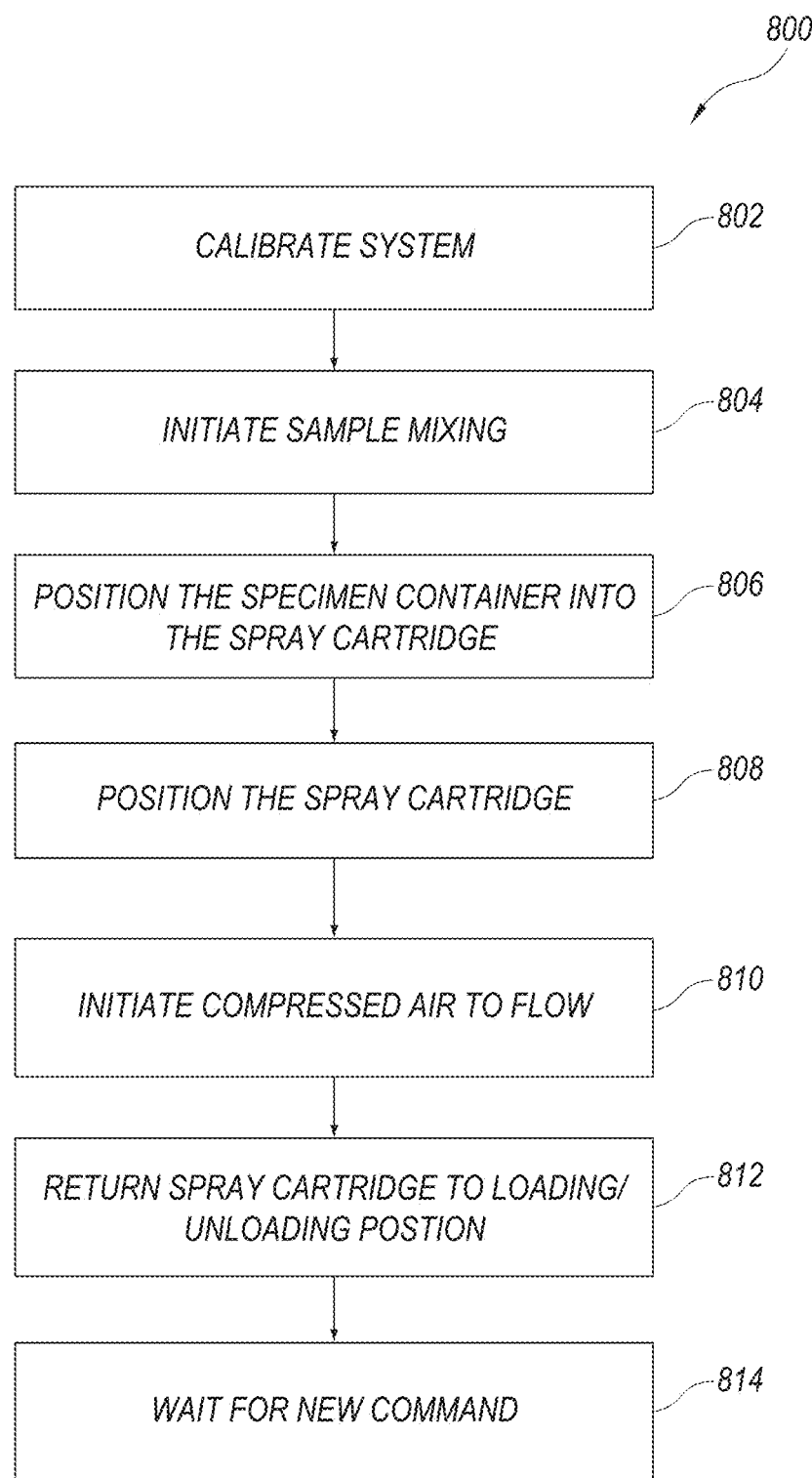
FIG. 8 is a flow diagram illustrating a method for generating specimen-bearing slides in accordance with an embodiment of the present technology.

FIG. 8 is block diagram illustrating a method 800 for generating specimen-bearing substrates using the automated specimen deposition system 100 described above and with reference to FIGS. 1-7. With reference to FIGS. 1-8 together, the method 800 can include, optionally, calibrating the system 100 (block 802). Calibration of the system 100 can include receiving instructions regarding the specimen type, fluid type and/or the concentration of the specimen and adjusting spray deposition parameters based on the instructions. The method 800 can also include initiating sample mixing (e.g., vortexing, mixing, agitating, vibrating, etc.) within the specimen container 200 (block 804). For example, the controller 712 executes instructions stored in memory 716 to command the spray positioning assembly 140 to mix the samples. The method 800 can further include positioning the specimen container 200 into the spray cartridge 120 (block 806). In some embodiments, the specimen container 200 is positioned, for example, using a pusher assembly or other motorized mechanism within the spray cartridge 120 such that the lower septum is penetrated by the puncture mechanism 128. The method 800 can also include positioning and/or aligning the spray cartridge 120 with respect to the substrate processing area 130, and in particular to the substrate 151 receiving the sprayed biological sample thereon (block 808).

Once aligned and positioned, for example, at the proper height above the substrate 151, the method 800 continues at block 810 by initiating compressed air to flow through and spray biological material from the specimen container 200 onto the surface of the substrate 151. Following spray deposition of the biological material, the method 800 can optionally include returning the spray cartridge 120 to a loading/unloading position separated from the substrate cartridge 150 (block 812). The method 800 can end, or alternatively, can include waiting for a new command from the controller 712 (block 814).

Other process flows and system commands are suitable for using the automated specimen deposition system 100 described herein with respect to FIGS. 1-7. Table 1 illustrates a process flow that demonstrates a step protocol for use of the system in accordance with one embodiment of the present technology.

TABLE 1

Spray Deposition Protocol

| Step | Action |
|---|---|
| 1 | Device powered on |
| 2 | Device access door is opened |
| 3 | Sample is scanned and logged |
| 4 | Sample is placed inside device, into sample holder |
| 5 | Access door is closed |
| 6 | Program parameters are set on digital display |
| 7 | Program is activated |
| 8 | Access door locks to prevent entry |
| 9 | Sample container is vortexed |
| 10 | Sample is automatically inserted into spray cartridge (by stage movement) |
| 11 | Spay cartridge is lowered on to protected substrate |
| 12 | Sample container is pushed down into spray cartridge and punctured |
| 13 | Compressed air port is connected to spray cartridge and compressed air is activated |
| 14 | Substrate is sprayed using programmed parameters: system pressure, spray time, sample volume, distance from nozzle to sample, spray shape, and sample density |
| 15 | System waits for sample to dry (optional element may be design to decrease dry time (heat, air, etc.) |
| 16 | Program completed, access door unlocked |
| 17 | Substrate housing (with substrate) is removed |
| 18 | Substrate may be removed from housing and post-processed |
| 19 | Components are removed and disposed using medical waste standard procedures |
| 20 | If system is designed for multiple samples, process would cycle through samples |

For clinical, diagnostic and research applications, high sample quality is desirable for deriving useful and accurate data from the samples. The system 100 and methods described herein facilitate generation of high-quality and reproducible specimen-bearing substrates. For example, the system is configured to both mix (or similar technique such as agitate, vortex, shake, etc.) the sample as well as count or determine cell concentration of each sample. Each collected biological sample may have a different quantity of cells thereby introducing variation between samples. In order to standardize the number of cells deposited onto a substrate, each sample can be quantified and the system 100 can adjust deposition parameters based on this information and desired criteria. For example, if a sample is assessed and determined to have 10,000 cells per mL of sample and the desired concentration of cells on the substrate is about 1,000 cells per square centimeter over a 1 square-centimeter area, then the system would deposit approximately 1/10 (or 100 microliters). In another example, a second biological sample is determined to have about 5,000 cells per mL of sample. In this example, and given the same desired concentration of cells on the substrate, they system 100 would deposit approximately ⅕ (or 200 microliters). As biological samples are expected to have variation in the quantity of cells present in the specimen container 200, it may be desirable to adjust parameters, such as spray volume, which will govern the quantity of cells deposited onto a substrate (e.g., per-spray volume, total-volume sprayed). Additional adjustments to spray volume may be made based on cell type(s) within the biological sample. For example, for samples containing large cells, the desired concentration of cells on the substrate maybe lowered.

In one embodiment, electrical impedance can be used for determining cell concentration within the sample. For example, as the cells are pumped through a chamber, the impedance changes which may be correlated to cell quantity in the tested sample. An alternative approach for determining cell concentration within the sample would include the use of a laser and sensor to detect changes in intensity due to the presence of shadows (e.g., as detected by an optical sensor). As intensity changes, voltage will vary, accurately assessing cell counts per volume. Each of these cell counting methods can be performed, for example, with the use of a motorized syringe pump to pull the sample through a chamber that would be controlled via the controller 712.

In various arrangements, the spray deposition process can be optimized for each biological sample. The spray deposition parameters (e.g., distance of spray nozzle from substrate, air pressure, air flow rate, nozzle design, per-spray volume, total volume, drying temperature, air drying time) can be a function of various sample properties, such as cell type, cell concentration, and transport or suspension liquid characteristics, such that:

$$[\text{distance, air pressure, air flow rate, nozzle design, per-spray volume, total volume, temperature drying, air drying}] = f(\text{cell type, concentration, liquid-type})$$

Biological sample preparation and deposition can vary based on cellular characteristics such as shape, size, and sensitivity (e.g., fragility). Examples of parameters that can be varied based on cell type/specimen type can include:

1a. Distance between spray nozzle and substrate surface: the distance between the spray nozzle from the substrate can be varied for cells with different size and shape as the spray pattern can change at different distances. In certain embodiments, air pressure may need to be increased/decreased to accommodate the change in distance.

1b. Maximum gas/air pressure: the pressure at which cells are deposited can be varied to accommodate the size and shape of different cell types.

1c. Gas flow rate: the rate at which gas (compressed air) will flow through the specimen container/spray cartridge can be optimized for each cell type. The size, shape and sensitivity of each cell type may be different and flow rates suitable for each cell type can be utilized/programed.

1d. Nozzle design: the biological sample can be deposited on the substrate surface in a manner that yields a uniform layer of non-overlapping cells. In some embodiments, cell deposition can be designed to yield cells that are isolated (e.g., separated, non-touching) from other deposited cells on the surface of the substrate. Accordingly, the system can provide individual nozzle designs suitable to uniformly deposit specific sample types.

1e. Per spray volume: the per-spray volume deposited from each biological sample can be controlled to accommodate the unique sizes and shapes of varying cell types. In some embodiments, the sample can be sprayed multiple times onto the surface of the substrate to yield the desired deposition yield.

1f. Total volume: the total volume of biological material sprayed can also depend on determined cell type as both size and shape of each cell type vary.

1g. Temperature-based drying: sample drying (e.g., on the surface of the substrates) can be introduced and controlled to decrease sample preparation time. Evaporation can be enhanced by varying drying/heating mechanisms. In some embodiments incorporating multiple spray passes, the system can be configured to increase the temperature around the substrate to dry the sample on the surface of the substrate between each spray deposition process.

1h. Air drying: in some embodiments, the biological sample can be air dried to decrease sample preparation time.

Biological sample preparation and deposition can vary based on cell concentration. As discussed above, the system can be provided with mechanisms and process steps for quantitatively assessing each sample prior to deposition. Examples of parameters that can be varied based on cell concentration can include:

2a. Distance between spray nozzle and substrate surface: the distance between the spray nozzle from the substrate can be varied for various cell concentrations. In certain embodiments, the distance can be adjusted to prevent overlap of cells deposed on the substrate surface.

2b. Maximum gas/air pressure: the pressure at which cells are deposited can be varied to accommodate cell concentration.

2c. Gas flow rate: the air flow rate will need to be adjusted for varying concentration.

2d. Nozzle Design: the biological sample can be deposited on the substrate surface in a manner that yields a uniform layer of non-overlapping cells. In some embodiments, cell deposition can be designed to yield cells that are isolated (e.g., separated, non-touching) from other deposited cells on the surface of the substrate. Accordingly, the system can provide individual nozzle designs suitable to uniformly deposit cells from samples having varying concentrations within the specimen container.

2e. Per-spray volume: the per-spray volume deposited from each biological sample can be controlled to accommodate the varying cell concentrations within the specimen containers. In some embodiments, the sample can be sprayed multiple times onto the surface of the substrate to yield the desired deposition yield.

2f Total volume: the total volume of biological material sprayed can be varied or spread out into multiple spray passes. For example, if the concentration of the sample within the specimen container is low, the total volume of the spray passes can be increased. Conversely, if the concentration is high, less volume can be deposited.

2g. Temperature-based drying: sample drying (e.g., on the surface of the substrates) can be introduced and controlled to decrease sample preparation time. Evaporation can be enhanced by varying drying/heating mechanisms. In some embodiments incorporating multiple spray passes, the system can be configured to increase the temperature around the substrate to dry the sample on the surface of the substrate between each spray deposition process (e.g., to prevent cell aggregation and/or movement on the substrate surface).

2h. Air drying: in some embodiments, the biological sample can be air dried to decrease sample preparation time. In some embodiments, air drying the samples may be suitable for cells sensitive to environmental changes.

Biological sample preparation and deposition can also vary based on the type/characteristics of the storage/transport liquid the biological sample is suspended within. For example, storage/transport liquids can vary in density and viscosity, which may alter the deposition of the biological material using the described spray system. Examples of parameters that can be varied based on liquid type can include:

3a. Distance between spray nozzle and substrate surface: the distance between the spray nozzle from the substrate can be varied depending on the type and characteristics of the liquid. For example, liquid flow and spread on a surface can be affected by density and viscosity.

3b. Maximum gas/air pressure: the pressure at which cells are deposited can be varied to accommodate the composition of the liquid. To maintain uniform deposition cycles, the gas/air pressure can be altered for liquids that vary in density and viscosity.

3c. Gas flow rate: the rate at which gas (compressed air) will flow through the specimen container/spray cartridge can be optimized for liquid composition. For example, changes in liquid properties, can alter the flow rate at which the fluid will exit the spray nozzle.

3d. Nozzle design: the biological sample can be deposited on the substrate surface in a manner that yields a uniform layer of non-overlapping cells. Variations in liquid composition may affect spray pattern that can be addressed by varying the nozzle design to yield a uniform deposition of the samples on the substrate surface.

3e. Per spray volume: the per-spray volume deposited from each biological sample can be controlled to accommodate the variations in liquid composition (density, viscosity).

3f Total volume: liquid composition can affect how cells are dispersed within a sample. Accordingly, the total volume can be varied to prepare uniform samples.

3g. Temperature-based drying: temperature-based drying can be incorporated for samples in certain liquids in order to maintain optimal drying times. Evaporation can be enhanced by varying drying/heating mechanisms.

3h. Air drying: in some embodiments, the biological sample can be air dried to decrease sample preparation time.

The spray deposition parameters described above, as well as other parameters (e.g., liquid temperature, biological sample temperature, etc.) can be pre-programmed such that a user of the system can select and/or optimize the spray deposition program suitable for the type of cell or liquid in a particular biological sample. In some embodiments, the system 100 can screen the specimen-bearing substrates to determine if the spray deposition of the sample met the program criteria (e.g., sufficient cells were deposited, no overlapping cells etc.). Such screening methods may include screening the specimen-bearing slides by laser and/or by spectrographic techniques.

The instruments and systems of the present technology enable rapid, high throughput, and/or automated generation of specimen-bearing substrates. The benefits of these instruments, systems, and/or combination of components are not limited to any particular application. In some embodiments, any combination of components of a specimen deposition system may be utilized to achieve a desired function or process. In particular embodiments, specimen deposition systems provide a procedure and process for high quality specimen-bearing substrates, wherein a biological sample is deposited on substrates for further processing and or data collection, such as to identify targets or potential targets (e.g., cells, cells with potential nanoarchitectural abnormalities, potentially cancerous cells, etc.). Such embodiments allow for the generation of specimen-bearing substrates from which high resolution data can be acquired of targets in a suitable timeframe for research, clinical and/or diagnostic purposes.

A biological specimen can include one or more biological samples. Biological samples can be a tissue sample or samples (e.g., any collection of cells) removed from a subject. The tissue sample can be a collection of interconnected cells that perform a similar function within an organism. A biological sample can also be any solid or fluid sample obtained from, excreted by, or secreted by any living organism, including, without limitation, single-celled organisms, such as bacteria, yeast, protozoans, and amebae, multicellular organisms (such as plants or animals, including samples from a healthy or apparently healthy human subject or a human patient affected by a condition or disease to be diagnosed or investigated, such as cancer). In some embodiments, a biological sample is mountable on a microscope slide and includes, without limitation, a section of tissue, an organ, a tumor section, a smear, a frozen section, a cytology prep, or cell lines. An incisional biopsy, a core biopsy, an excisional biopsy, a needle aspiration biopsy, a core needle biopsy, a stereotactic biopsy, an open biopsy, or a surgical biopsy can be used to obtain the sample.

EXAMPLES

Example 1

Buccal Cell Collection and Spray Deposition

The quality and reproducibility of spray deposition of biological samples on microscope slides, in accordance with aspects of the present technology was verified by performing experiments on collected Buccal cells. Buccal cells were harvested and collected in specimen vials containing different types of liquid (e.g., transport liquid). Cells were placed into the variable test liquids and then deposited on slides using the spray deposition methods described herein. Table 2 shows the type and concentration of the transport liquids used to collect and transport the buccal cells.

TABLE 2

| Transport Liquid Tested | Concentration |
|---|---|
| Ethanol | 10%, 20%, 25%, 30%, 40%, 50%, 60%, 70%, 80%, 90%, 95%, 100% |
| Methanol | 10%-100% |
| Isopropanol | 10%-100% |
| DI water/PBS buffer | — |
| Formaldehyde/Formalin | 0.05%, 0.1%, 2%, 4%, 38% |
| Gluteraldehyde | 25% |
| Acetone | |

TABLE 2-continued

| Transport Liquid Tested | Concentration |
|---|---|
| Glacial acetic acid (as an additive to alcohol or aldehyde) | ~0.5% v/v |
| ThinPrep ® CytoLyt ® solution | 10%-100% |
| Bouin's solution | 10%-100% |
| SurePath ® solution | 20%, 40%, 60%, 80%, 100% |
| Multiple combinations of the above mentioned fixatives | — |

Figure 9A:
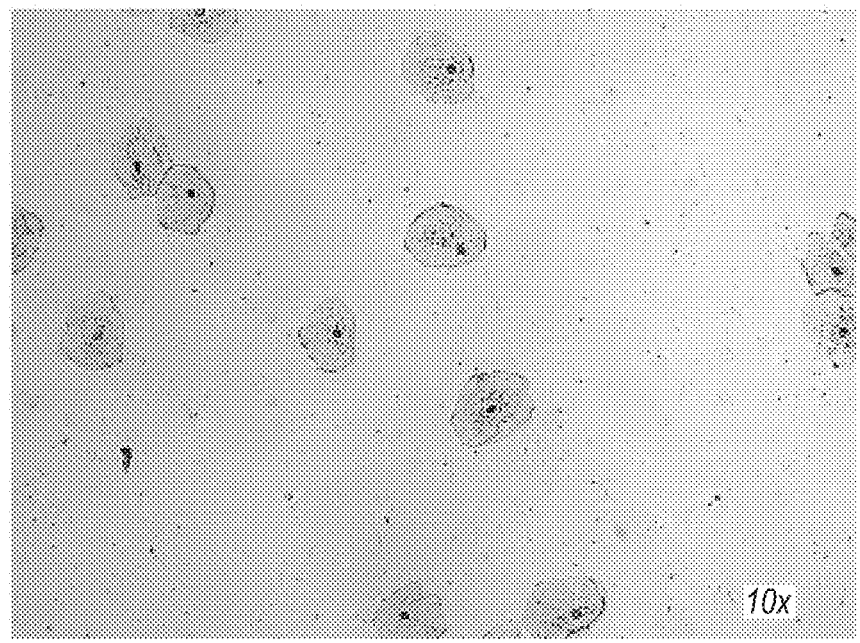
FIGS. 9A-9B are 10× and 40× images of Buccal cells, respectively, prepared on slide substrates in accordance with embodiments of the present technology.
Figure 9B:
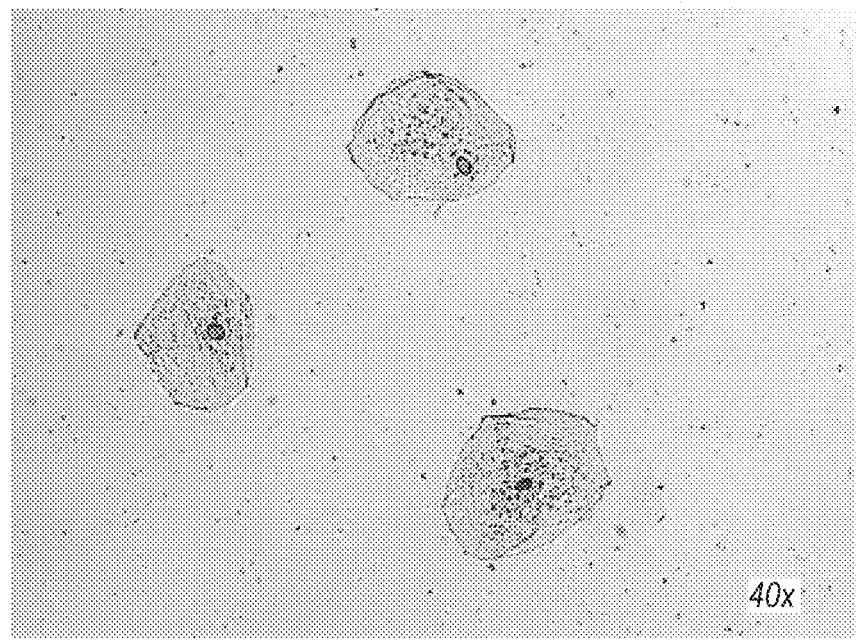

FIGS. 9A-9B are 10× and 40× images of Buccal cells in 25% ethanol and deionized water, respectively, and which were deposited using spray deposition and in accordance with aspects of the present technology. As shown in FIGS. 9A-9B, the cells are isolated, undamaged, not folded and round. Accordingly the cell state is of high quality and suitable for analysis, including partial wave spectrometry (PWS) analysis.

Figure 10A:
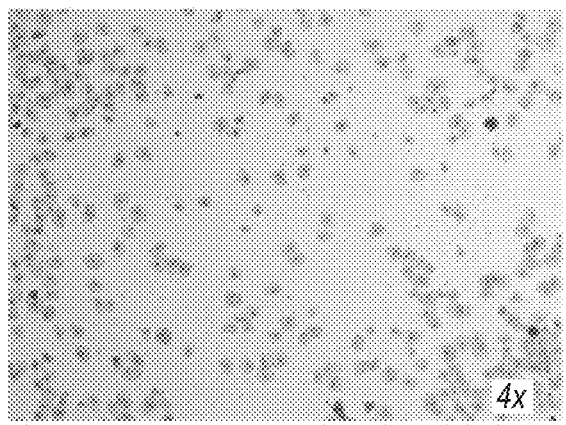
FIGS. 10A-10B are 4× and 10× images of Buccal cells in 25% ethanol and deionized water, respectively, and deposited on slide substrates in accordance with embodiments of the present technology.
Figure 10B:
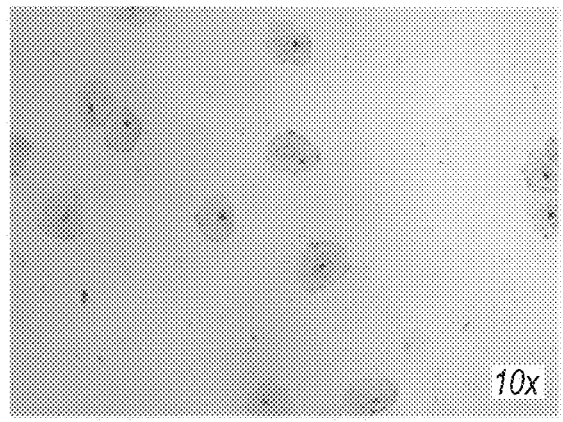
Figure 10C:
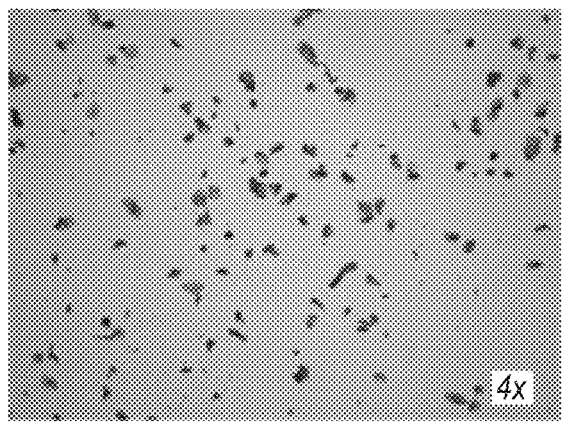
FIGS. 10C-10D are 4× and 10× images of Buccal cells in CytoLyt solution, respectively, and deposited on slide substrates in accordance with aspects of the present technology.
Figure 10D:
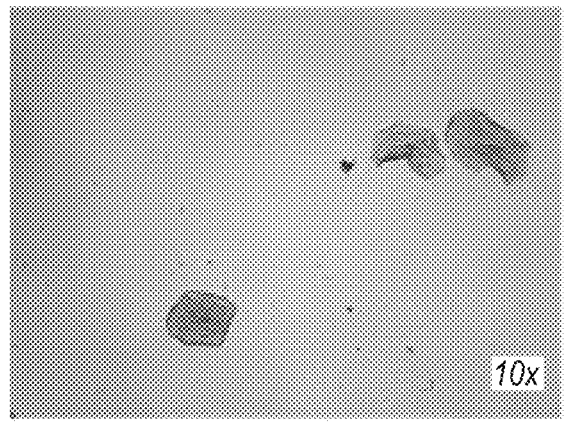
Figure 10E:
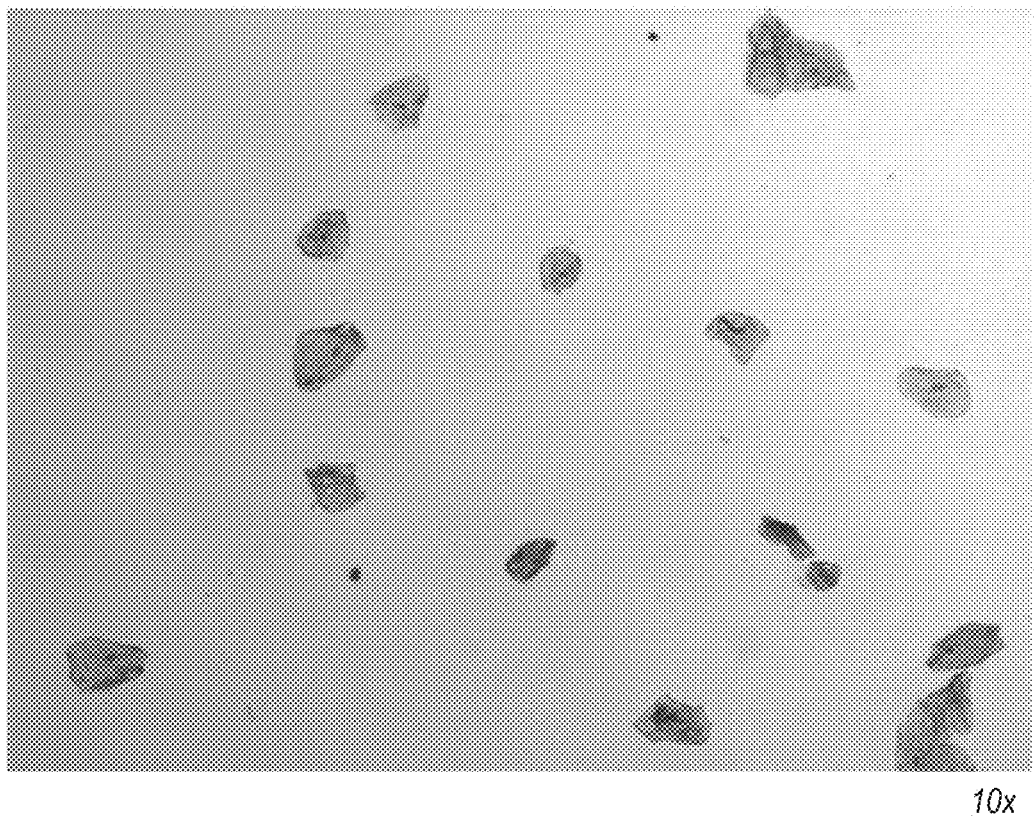
FIG. 10E is a 10× image of Buccal cells in CytoLyt solution diluted 1:10 in PBS solution, and deposited on a slide substrate in accordance with aspects of the present technology.
Figure 11A:
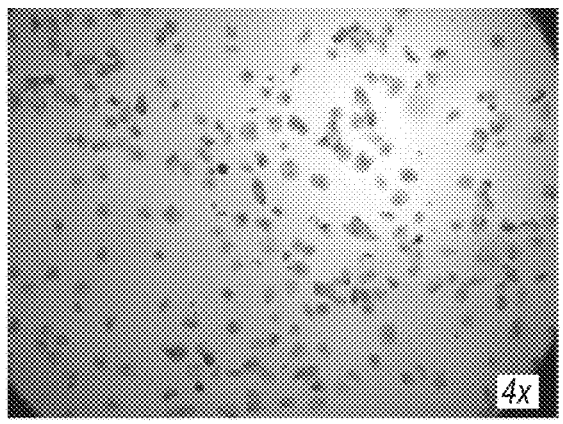
FIGS. 11A-23D are images of Buccal cells deposited on slide substrates in accordance with embodiments of the present technology.
Figure 11B:
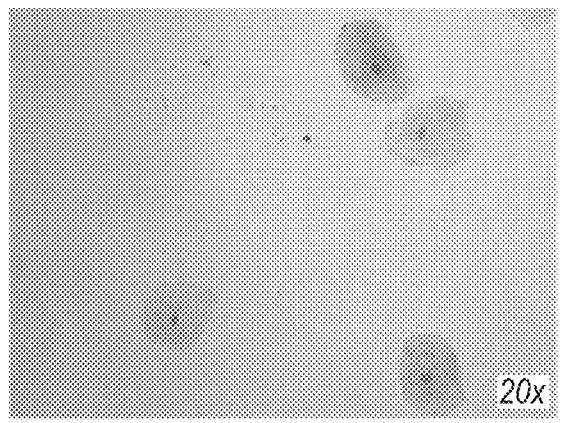
Figure 11C:
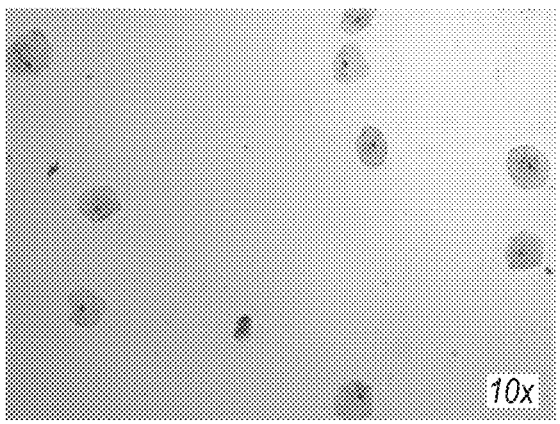
Figure 11D:
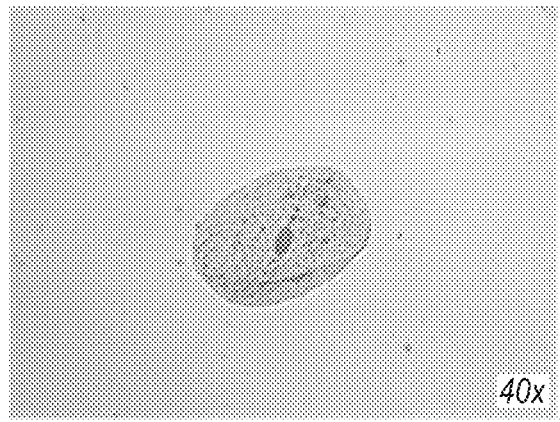
Figure 12A:
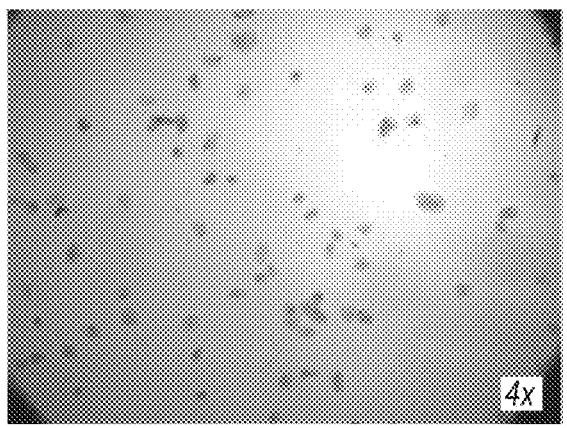
Figure 12B:
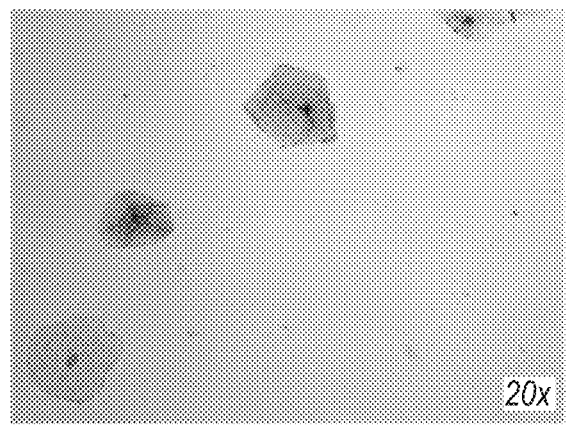
Figure 12C:
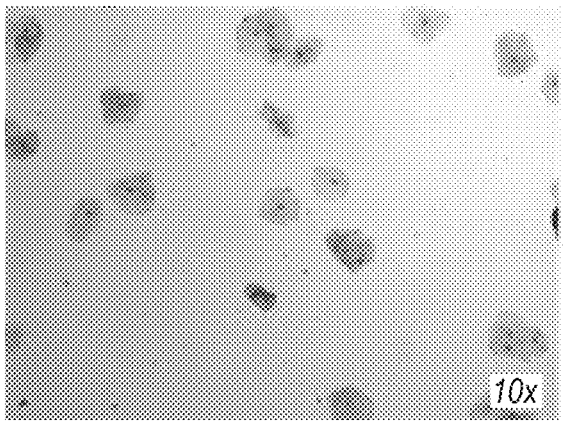
Figure 12D:
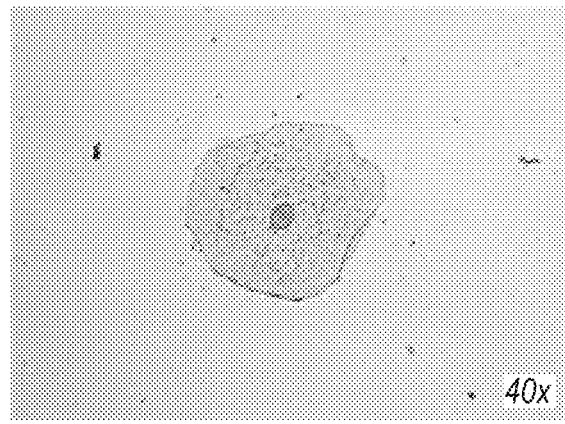
Figure 13A:
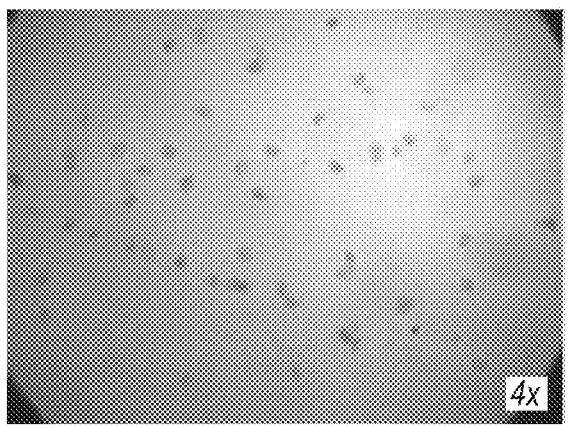
Figure 13B:
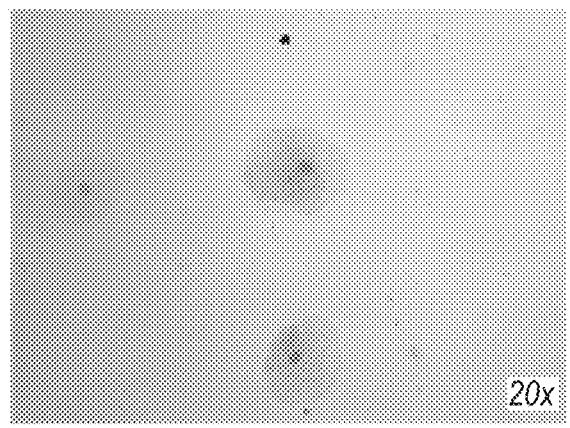
Figure 13C:
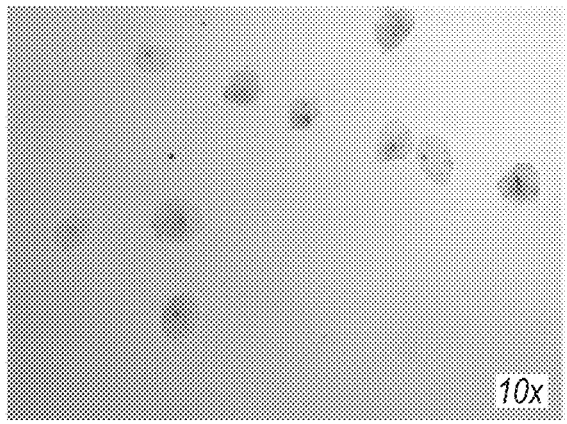
Figure 13D:
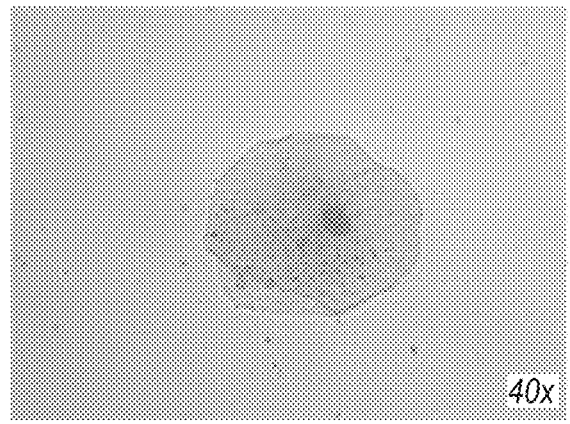
Figure 14A:
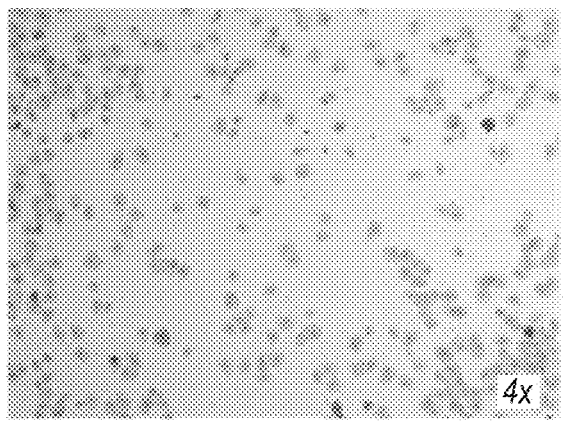
Figure 14B:
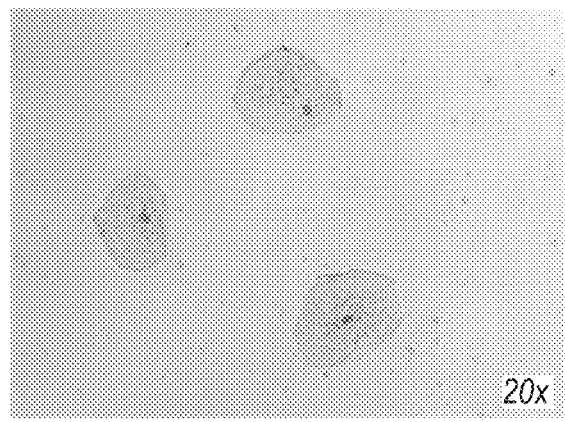
Figure 14C:
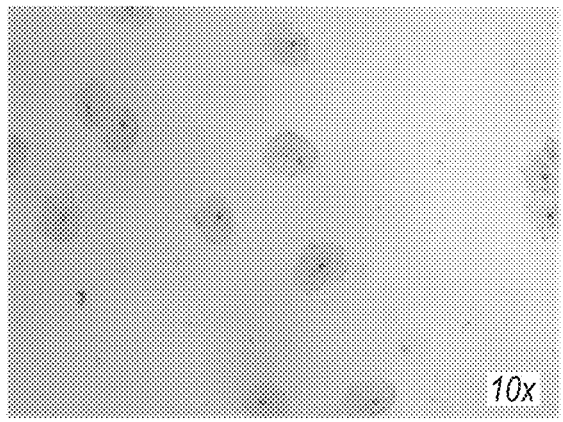
Figure 14D:
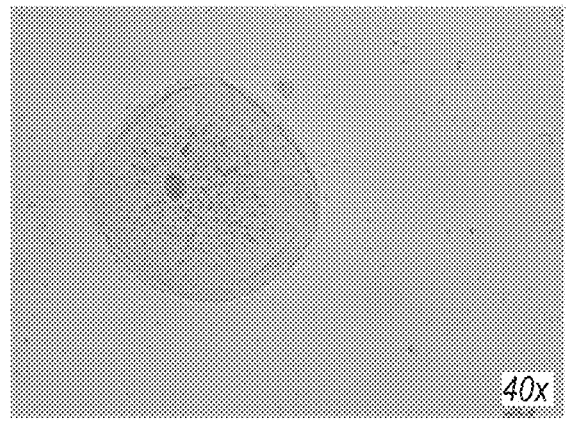
Figure 15A:
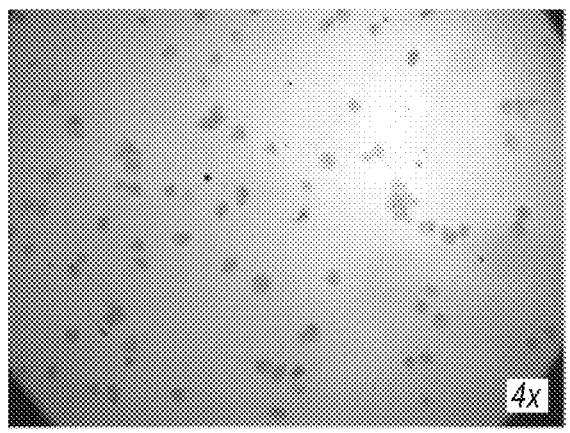
Figure 15B:
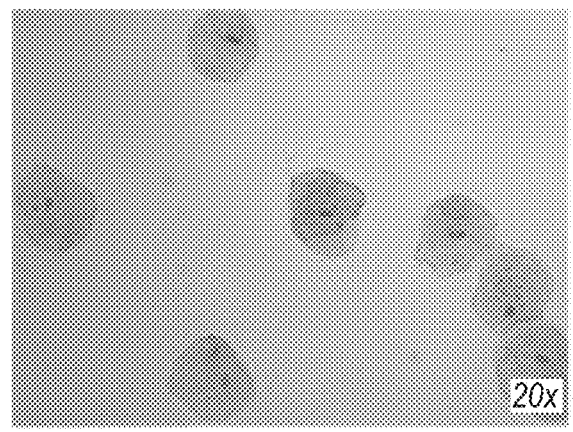
Figure 15C:
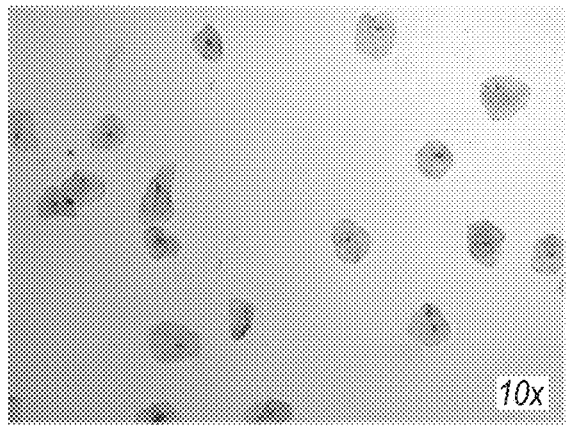
Figure 15D:
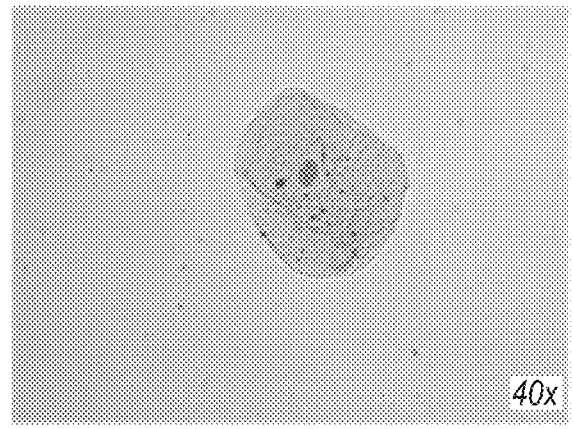
Figure 16A:
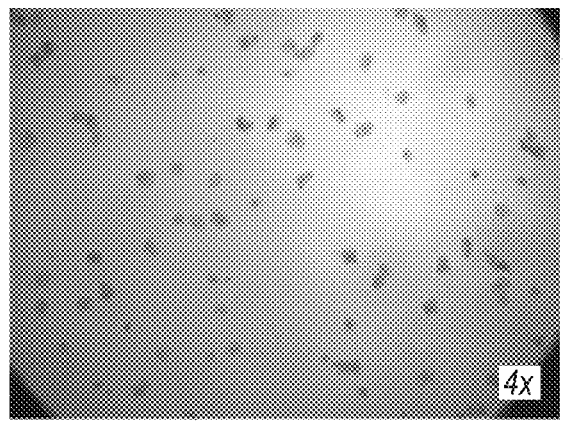
Figure 16B:
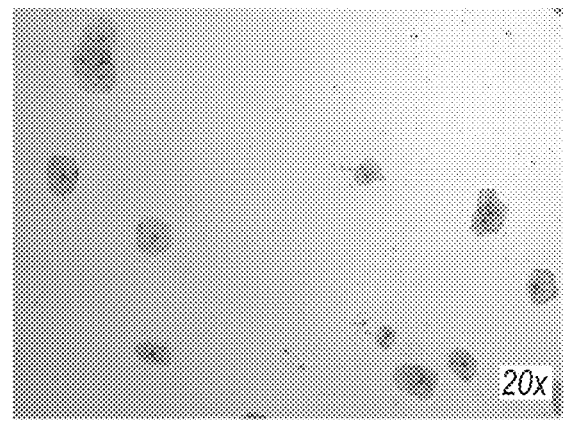
Figure 16C:
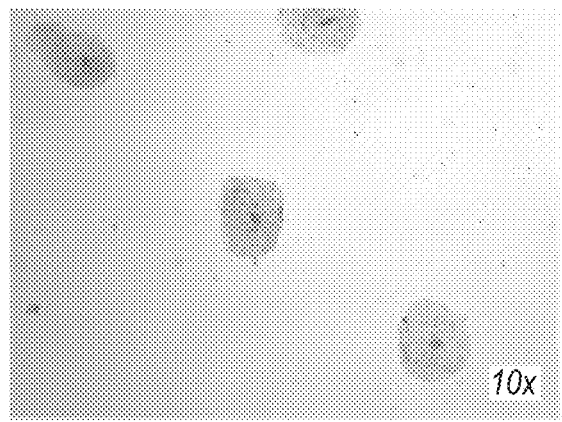
Figure 16D:
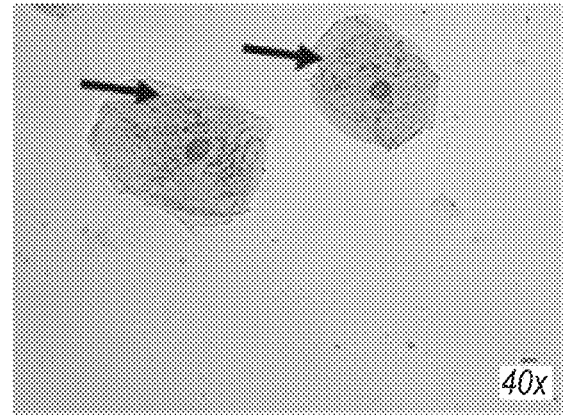
Figure 17A:
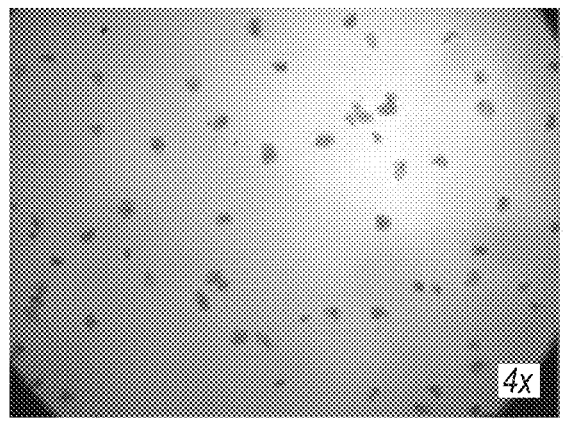
Figure 17B:
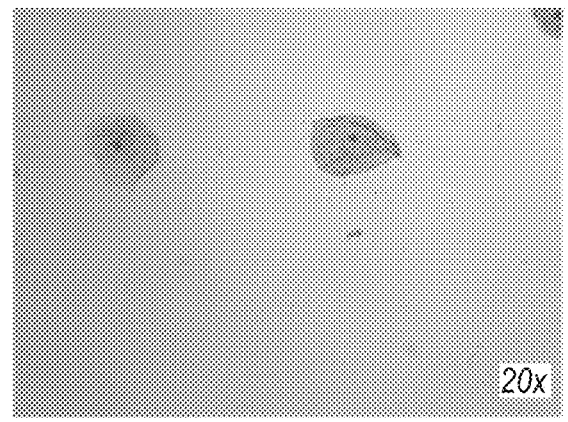
Figure 17C:
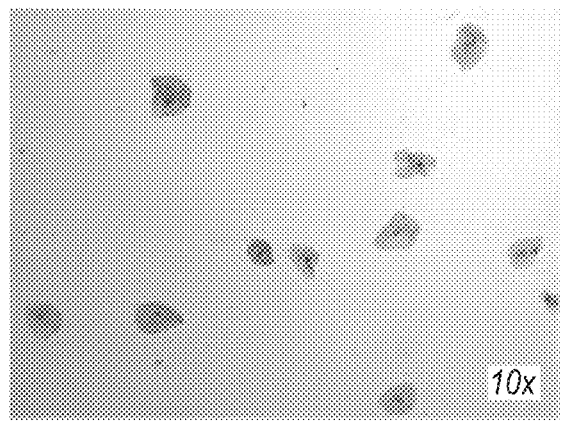
Figure 17D:
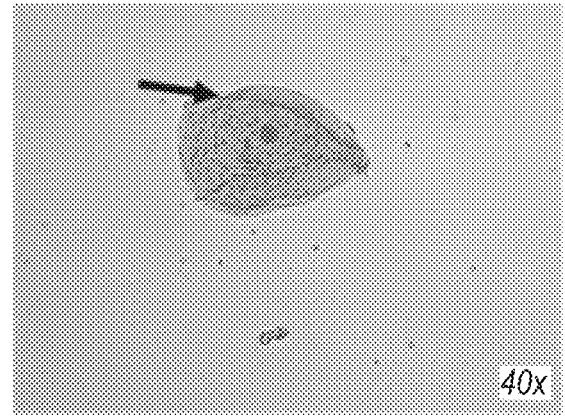
Figure 18A:
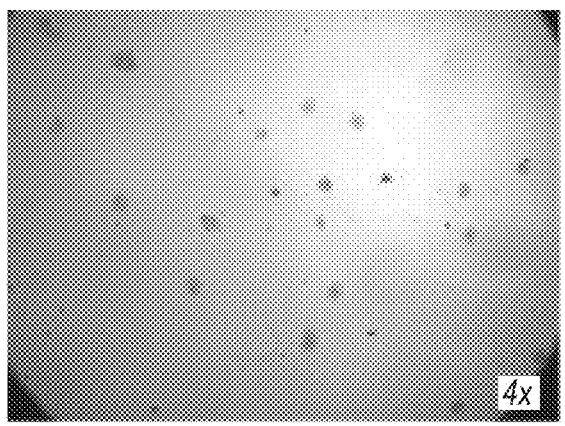
Figure 18B:
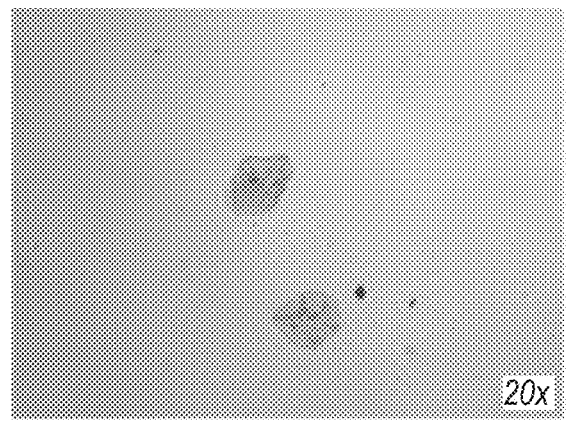
Figure 18C:
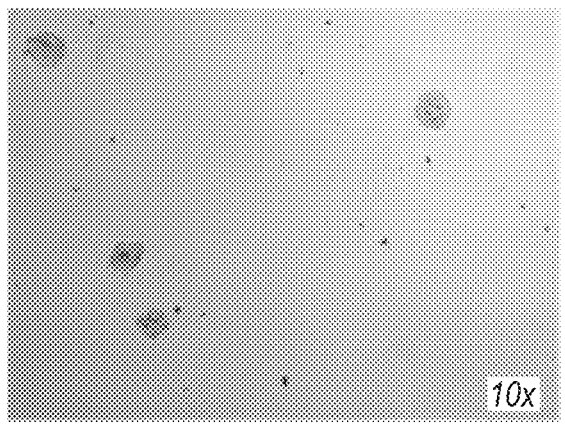
Figure 18D:
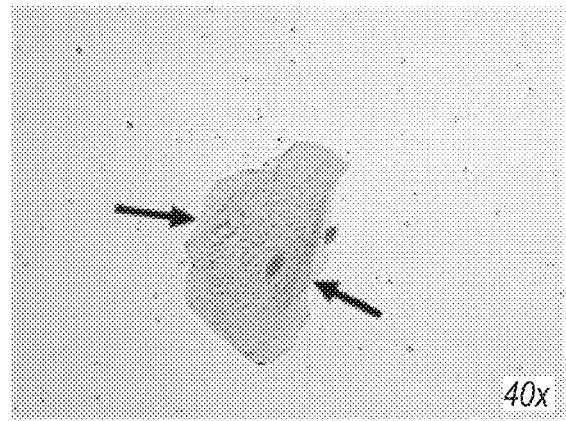
Figure 19A:
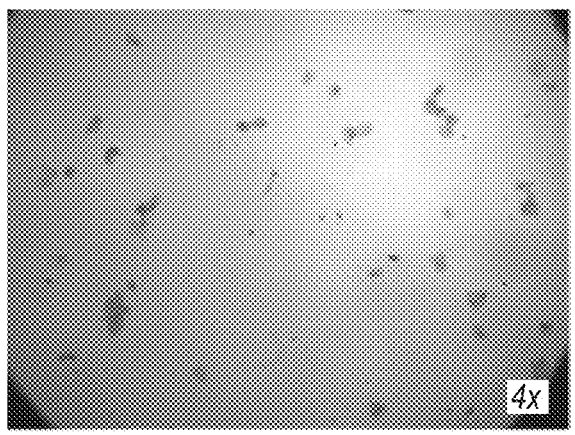
Figure 19B:
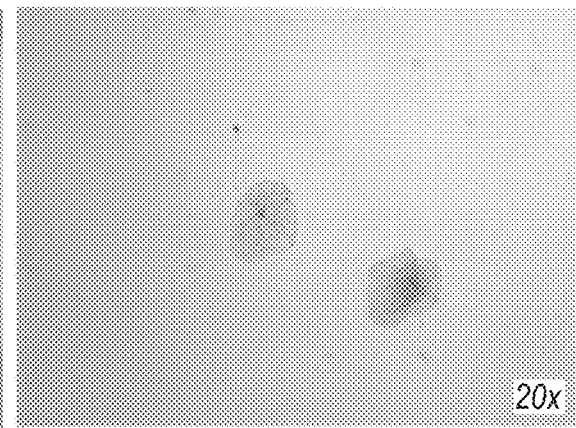
Figure 19C:
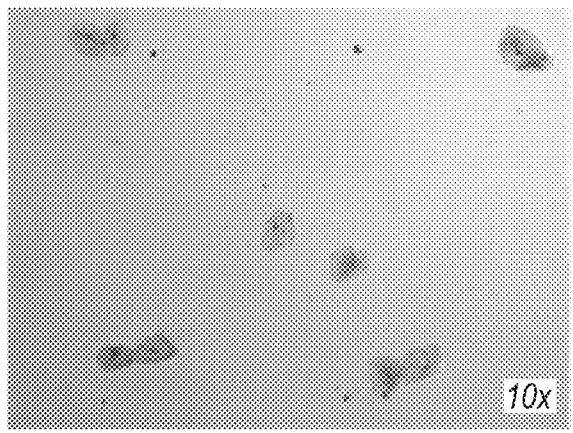
Figure 19D:
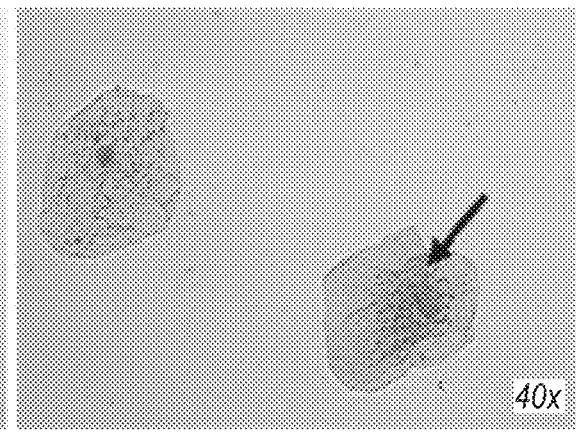
Figure 20A:
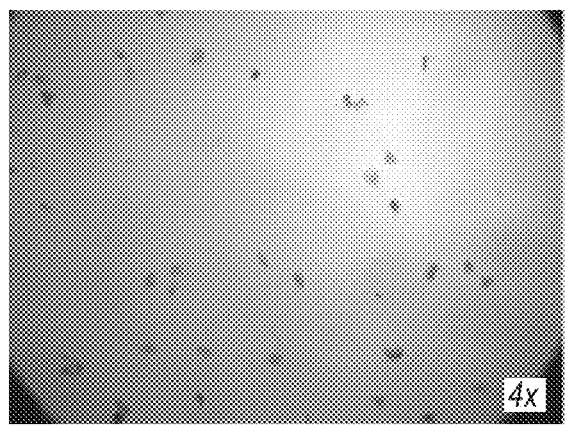
Figure 20B:
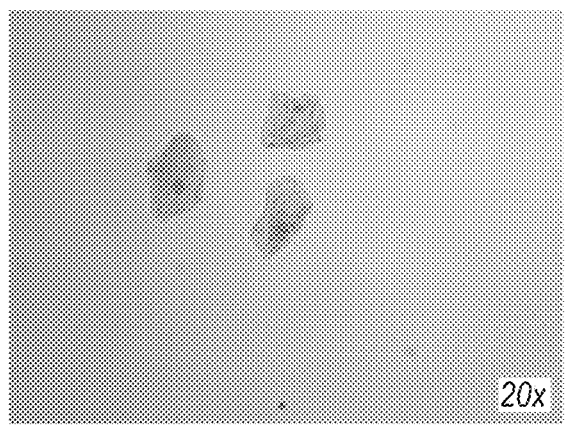
Figure 20C:
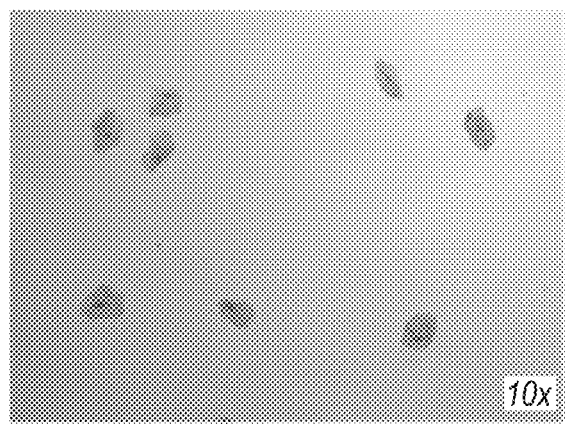
Figure 20D:
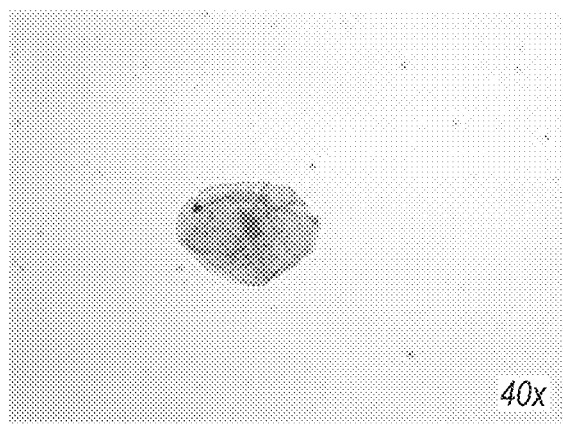
Figure 21A:
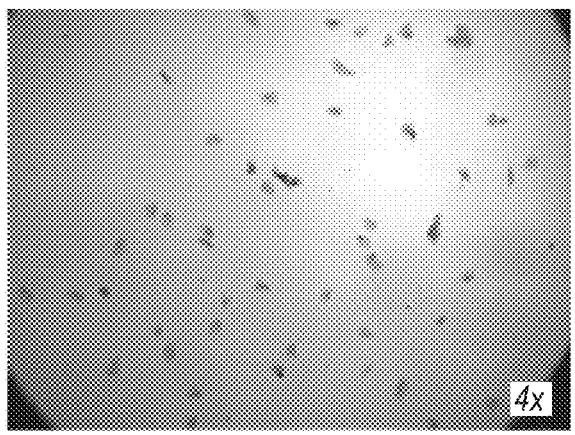
Figure 21B:
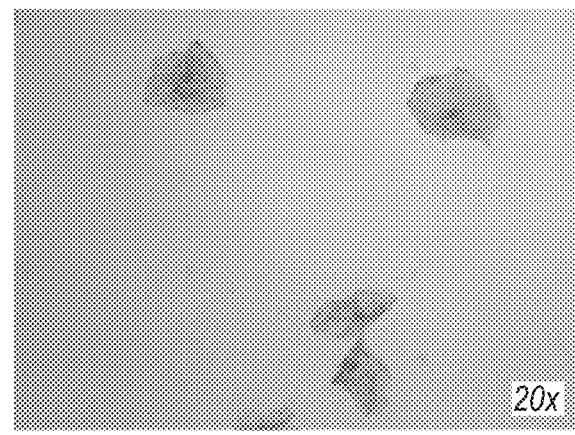
Figure 21C:
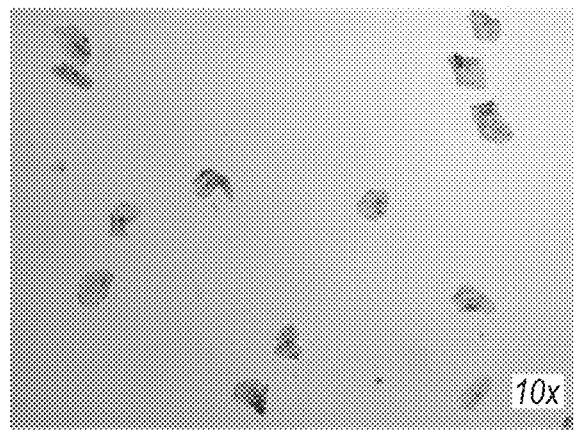
Figure 21D:
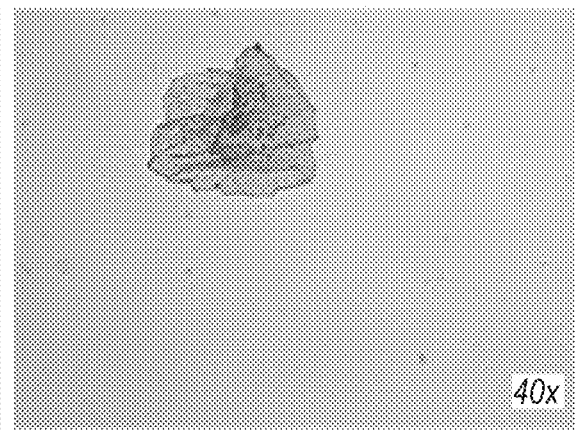
Figure 22A:
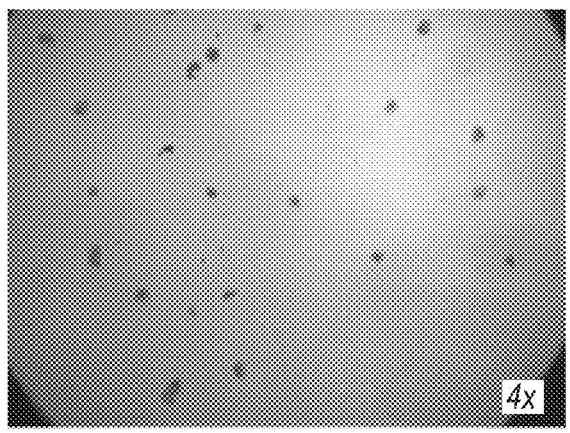
Figure 22B:
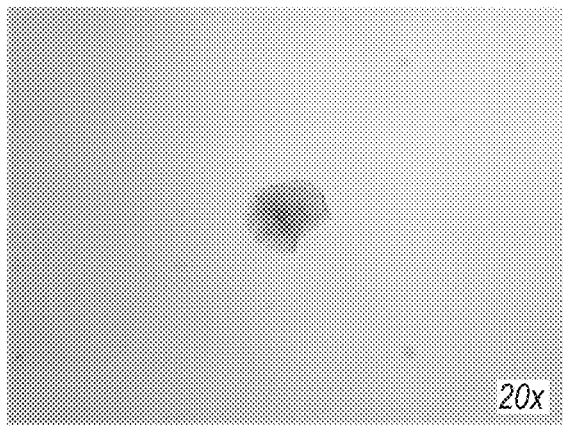
Figure 22C:
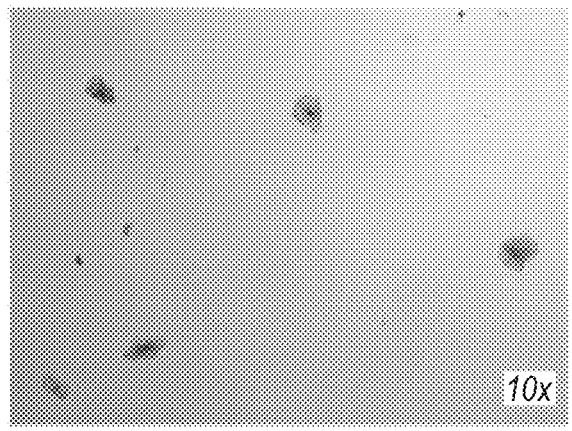
Figure 22D:
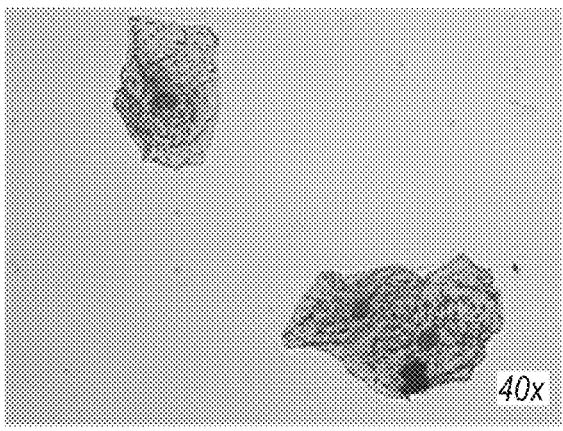
Figure 23A:
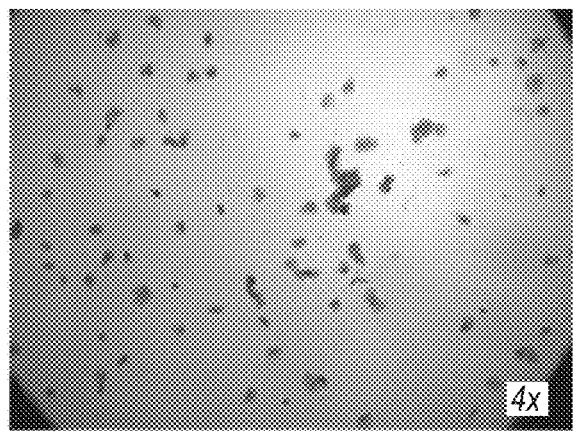
Figure 23B:
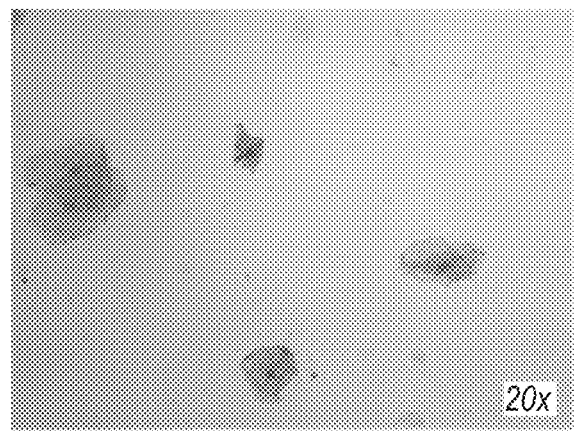
Figure 23C:
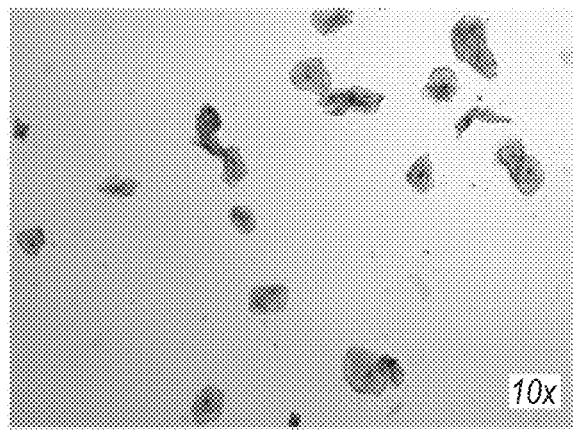
Figure 23D:
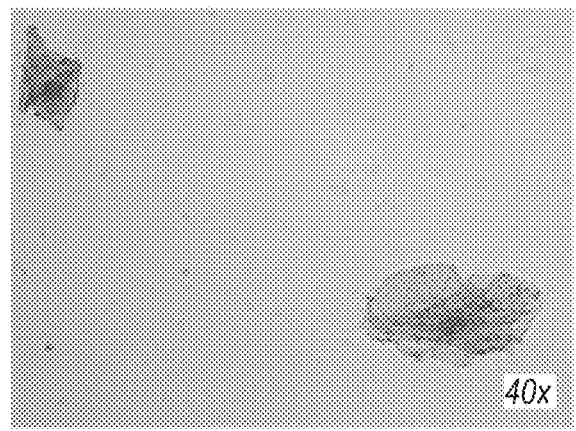

FIGS. 10A-10B are 4× and 10× images of Buccal cells in 25% ethanol and deionized water, respectively, and FIGS. 10C-10D are 4× and 10× images of Buccal cells in Thin-Prep® CytoLyt ° solution (available from Hologic Inc. of Marlborough, Massachusetts), respectively. Cells were deposited using spray deposition methods as described herein. As shown in FIGS. 10C-spray deposited cells from samples prepared with CytoLyt® solution exhibited many damaged cells and were unsuitable for PWS analysis. In contrast, spray deposited cells from samples suspended in 25% ethanol and deionized water (FIGS. 10A-10B) demonstrated good quality and were suitable for PWS analysis. In order to determine if the concentration of CytoLyt® solution is a factor resulting in the lower quality of cells deposited on the slide, CytoLyt® was diluted 1:10 with PBS and cells were collected and spray deposited as described. As shown in FIG. 10E, the diluted CytoLyt® solution still exhibited damaged cells that were inferior for use in PWS analysis.

The proprietary solution, ThinPrep® Cytolyt®, did not yield suitable cell samples for PWS analysis. Specifically, cell samples prepared using spray deposition with Thin-Prep® Cytolyt® exhibited isolated cells, however cell shape was distorted and/or cells had folding. As such, 25% ethanol in deionized water is a superior transfer liquid compared to Cytolyt when using spray deposition.

FIGS. 11A-23D are images of buccal cells deposited on slide substrates using spray deposition. FIGS. 11A-11D are 4×, 20×, 10× and 40× images, respectively, of buccal cells stored in deionized water alone. As shown in FIGS. 11A-11D, cells stored in deionized water are suitable for PWS analysis but bacterial growth in the collected sample can be a problem for analysis over time. Buccal cells stored in 10% ethanol in deionized water yield suitable cells for PWS and other imaging analysis (FIGS. 12A-12D), however, growth of bacteria may occur if the cells are not processed within a short time period after collection.

Other concentrations of ethanol in deionized water were tested as suitable transport solutions/preservative solutions for collecting and preserving buccal cell samples for imaging, PWS and/or other types of analysis. For example, 20% ethanol in deionized water (FIGS. 13A-13D), 25% ethanol in deionized water (FIGS. 14A-14D), 30% ethanol in deionized water (FIGS. 15A-all presented isolated cells with good cell characteristics preservation suitable for PWS and other analysis. Buccal cells collected and stored in 40% ethanol in deionized water (FIGS. 16A-16D) and 50% ethanol in deionized water (FIGS. 17A-17D) yielded cells suitable for PWS and other analysis, but some cells displayed slight folding on the edges (black arrows) which can be a sign of cell stress.

Buccal cells collected and stored in 60% ethanol in deionized water (FIGS. 18A-18D) yielded fewer cells suitable for analysis and displayed slightly more signs of stress and folding on the edges (black arrows). Buccal cells collected and stored in 70% ethanol in deionized water (FIGS. 19A-19D), 80% ethanol in deionized water (FIGS. 20A-20D), 90% ethanol in deionized water (FIGS. 21A-21D), 95% ethanol in deionized water (FIGS. 22A-22D) and in 100% ethanol in deionized water (FIGS. 23A-23D) all displayed smaller cells, decreased density of cells and cells having folds (black arrows). Accordingly, cells collected and stored in 60% to 100% ethanol generally demonstrated qualities unsuitable for analysis, while cells collected and stored in 10% to 50% ethanol demonstrated cell qualities and deposition qualities suitable for PWS analysis as well as other types of analysis.

Example 2

Cell Deposition in Accordance with the Prior Art

There are inherent limitations with current liquid-based approaches for generating biological tissue prepared microscope slides. For example, microscope slides can be generated with too many cells, overlapping cells or with multiple layers of cells, which can make microscopy difficult or impossible. Further challenges include analyzing and diagnosing a patient from tissue samples when the cellular structures are distorted or deteriorated as a result of cell transfer to the slides. Cell smearing approaches also include the inherent challenges discussed above. Additionally, these techniques of placing the sampling collection device (e.g., spatula, brush, swab, etc.) on the glass slide results in capture of only the cells that are in contact with the slide and not a proportional representation on the slide of all the cells collected in a sample taken from the patient. In some cases, an inadequate number of cells are preserved on the slide, resulting in the need for re-screening. In using either technique for generating biological tissue prepared microscope slides, and even when the number of cells is adequate, the appearance of the resultant slide can be highly variable: the cells may be clumped, overlapping, and poorly preserved. Additionally, visibility of cellular features may be partially obscured by blood or drying artifacts.

Figure 24:
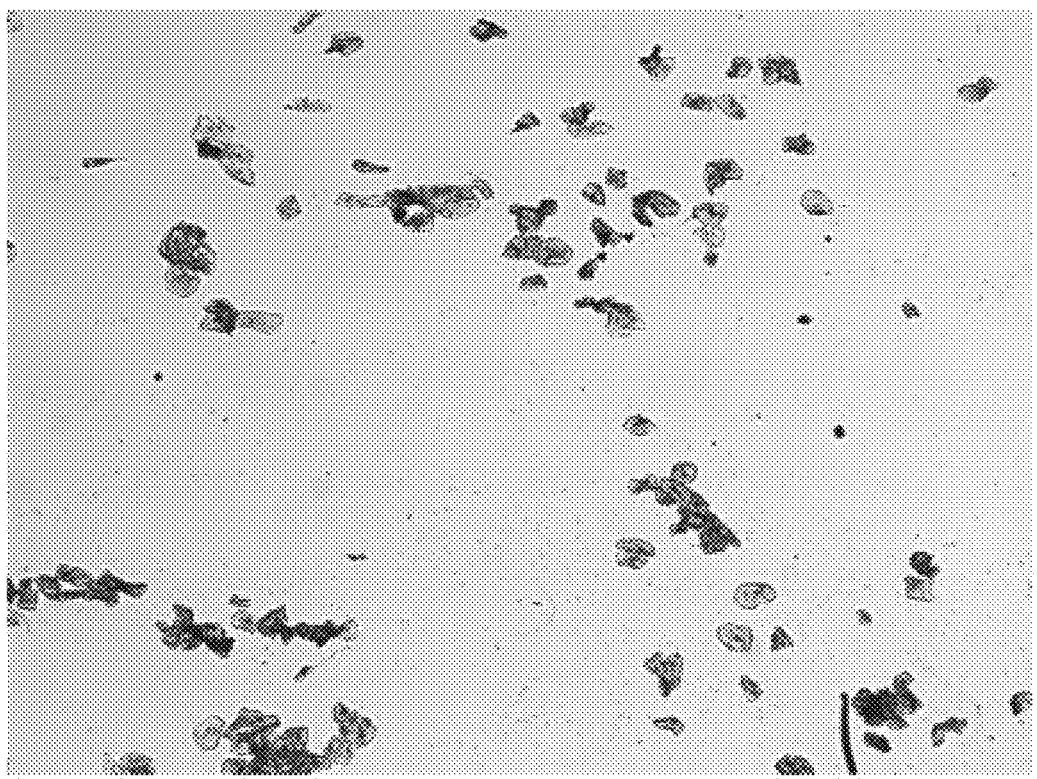
FIGS. 24-25L are images of Buccal cells deposited on slide substrates in accordance with the prior art.
Figure 25A:
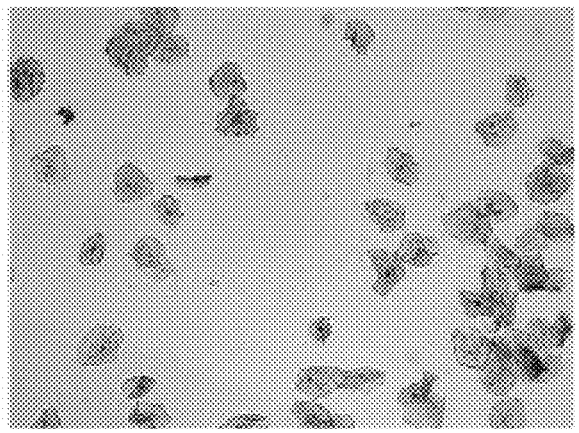
Figure 25B:
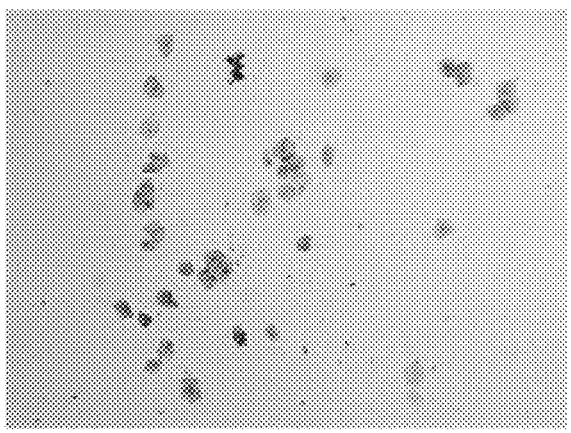
Figure 25C:
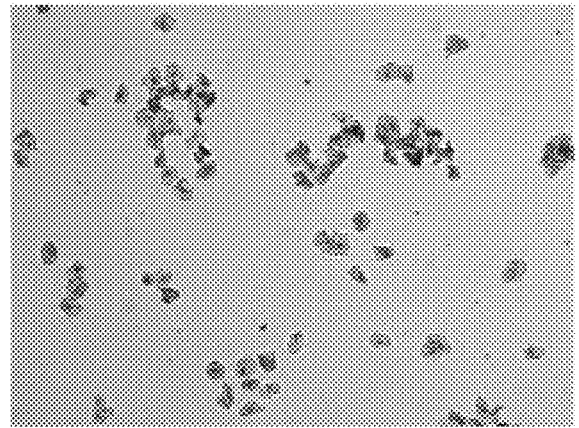
Figure 25D:
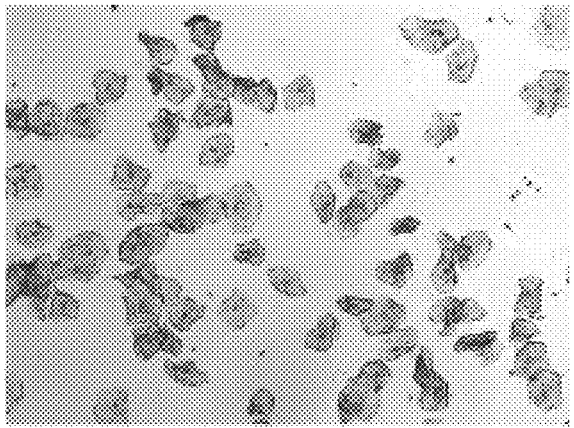
Figure 25E:
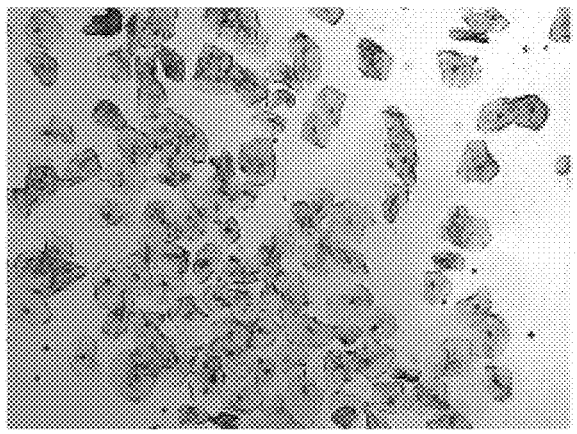
Figure 25F:
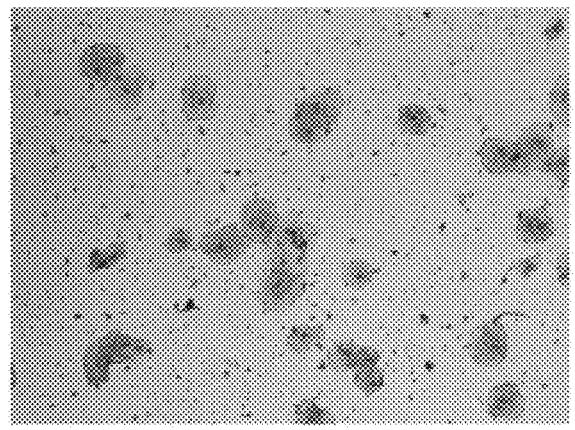
Figure 25G:
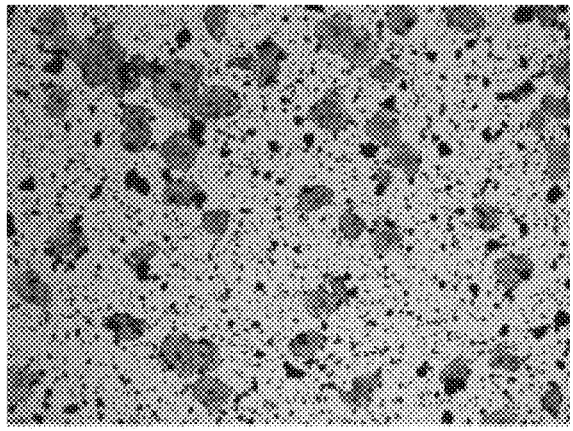
Figure 25H:
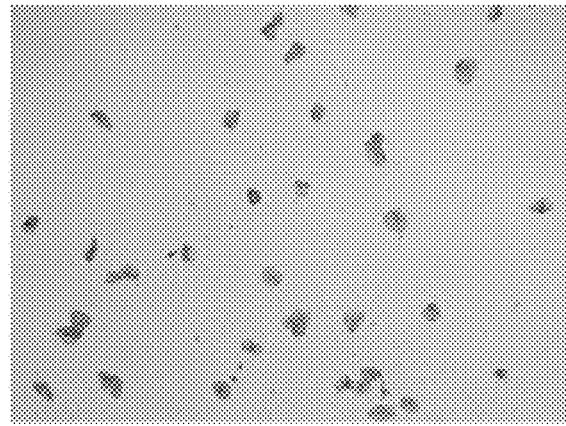
Figure 25I:
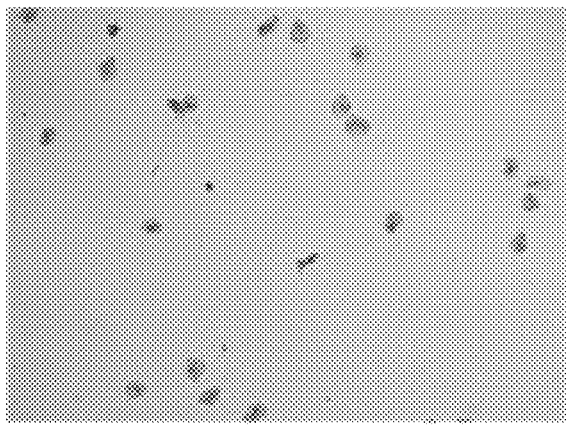
Figure 25J:
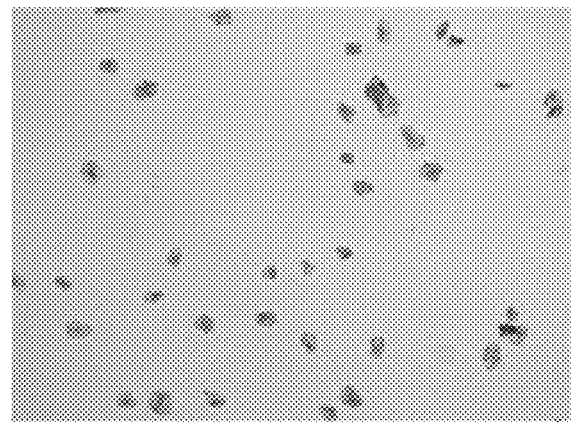
Figure 25K:
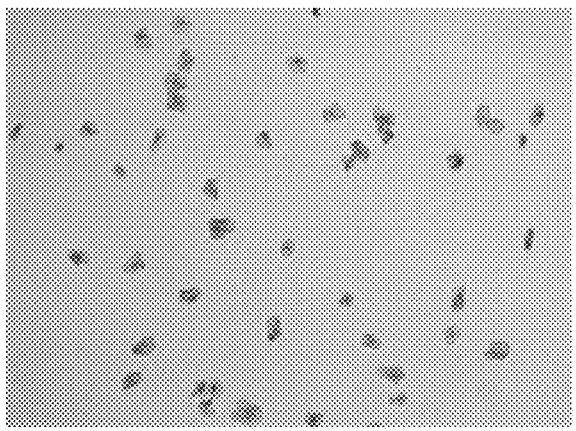
Figure 25L:
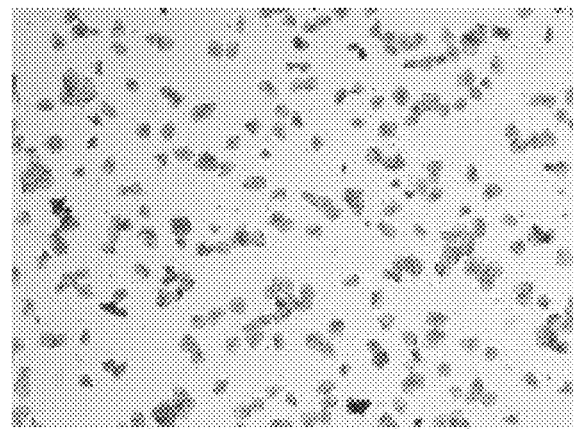

FIGS. 24-25L are images of Buccal cells deposited on slide substrates in accordance with aspects of the prior art. For example, FIG. 24 is an image of buccal cells collected and stored in 25% ethanol in deionized water and deposited on a microscope slide using the smear preparation described above. As shown in FIG. 24, smear preparation caused the cells to be damaged, folded and/or clumped together (e.g., not isolated). The cell morphology as not round in shape and often presented jagged edges. The resultant morphology of the buccal cells in this example demonstrated that smear preparation was inferior for preparing cells for analysis.

FIGS. 25A-25L are images of buccal cells collected and stored in 20% ethanol (FIG. 10% methanol (FIG. 25B), 67% methanol (FIG. 25C), 0.05% glutaraldehyde (FIG. 25D), 2.0% glutaraldehyde (FIG. 25E), 25% glutaraldehyde (FIG. 25F), 4.0% paraformaldehyde (FIG. 1.0% Bouin's Solution (FIG. 25H), 0.4% Bouin's Solution (FIG. 25I), 0.2% Bouin's Solution (FIG. 25J), 0.1% Bouin's Solution (FIG. 25K), and 100% deionized water (FIG. 25L), followed by deposition by liquid droplet preparation. As shown in FIGS. 25A-25L, each of the liquid droplet preparations of cells yield inconsistent and inferior cell characteristics (e.g., small, folded, overlapping, clumped, etc.) unsuitable for PWS and other types of analysis.

The inherent draw backs to the conventional cell deposition techniques in the prior art result in large variability of sample quality as well as add variability and difficulty of sample preparation, collection and handling-time by clinicians and technicians. In contrast, aspects of the present technology provide high-quality prepared microscope slides with biological samples suitable for reproducible and high-quality preservation of cellular structures for accurate and/or high-resolution imaging and viewing for clinical, diagnostic and research purposes.

Aspects of the present disclosure relate to systems, apparatus and method for automated preparation of tissue samples on a substrate. Other aspects of the present technology relate to systems for sample processing and data acquisition, data maintenance, and data retrieval for sample processing. Furthermore, aspects of the present technology are directed to generation of high-quality, reproducible specimen-bearing substrates for diagnostic, clinical and other research applications. For example, structural aberrations, such as the cellular structural changes occurring during early neoplastic transformations (e.g., along a dysplasia-carcinoma sequence), typically occur relatively late in the process of carcinogenesis with the earlier stages generally silent from a pathological perspective and/or that detectable using conventional microscopy and/or with microscopic slide preparation as described above. From a clinical perspective (e.g., in cytological diagnosis), it is desirable to identify earlier stages of disease (e.g., carcinogenesis). At early stages, genetic/epigenetic changes may not yet have translated into microscopic consequences, although the fundamental nanoscale architecture of these cells may be perturbed during early neoplastic transformation. In particular the specimen-bearing substrates generated in accordance with aspects of the present technology are suitable for cytology techniques, such as PWS analysis.

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology, as those skilled in the relevant art will recognize. For example, an additional embodiment can include placing the specimen container(s) on a surface (e.g., platform) and aspirating contents from the specimen containers. The aspirated samples can be transferred (e.g., via automation) to a spray cartridge from which the biological material can be sprayed onto substrate(s). The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

The invention claimed is:

1. An automated specimen deposition system, comprising:
   a removable spray cartridge including a container for holding a cellular sample;
   a vibrating means configured to vibrate the container;
   a substrate comprising a monolayer of isolated cells of the cellular sample, the monolayer of isolated cells being deposited directly onto a surface of the substrate;
   a positioning structure configured to receive and align the removable spray cartridge with respect to the surface of the substrate;
   a heating mechanism configured to evaporate a transport solution on the surface of the substrate;
   a controller, communicatively coupled to the positioning structure, programmed to:
      (a) command the vibrating means to mix the cellular sample with the transport solution,
      (b) command the positioning structure to position and align the removable spray cartridge,
      (c) command a compressed air source to direct compressed air into the removable spray cartridge in a manner that sprays the cellular sample from a nozzle on the removable spray cartridge towards the substrate thereby resulting in the monolayer of isolated cells being deposited directly onto the surface of the substrate, (d) command the heating mechanism to heat the substrate; and a database, communicatively coupled to the controller, configured to store executable instructions to the controller for one or more of specimen intake, spray deposition, substrate indexing, or specimen-bearing substrate processing, wherein a design of the nozzle is configured to prevent overlapping of cells in the monolayer of isolated cells deposited directly on the surface of the substrate.

2. The automated specimen deposition system of claim 1, wherein the substrate is a microscope slide and the substrate is held within a substrate cartridge having a spray retainer configured to prohibit overspray of the cellular sample into an internal environment of the automated specimen deposition system.

3. The automated specimen deposition system of claim 2, wherein the spray retainer has a rectangular prismatic, cylindrical, or frusto-conical shape.

4. The automated specimen deposition system of claim 1, wherein the controller comprises a programmable processor for executing one or more spray deposition programs, and wherein the one or more spray deposition programs are selected at least in part based upon one or more of: cell type, cell concentration, and transport solution characteristics.

5. The automated specimen deposition system of claim 1, wherein the container is connected to the nozzle such that the cellular sample flows from the container to the nozzle.

6. The automated specimen deposition system of claim 1, wherein the specimen-bearing substrate processing comprises staining the monolayer of isolated cells of the cellular sample.

7. The automated specimen deposition system of claim 6, wherein staining the monolayer of isolated cells comprises hematoxylin and eosin (H & E) staining.

8. The automated specimen deposition system of claim 1, wherein the transport solution comprises 25% ethanol in deionized water.

9. The automated specimen deposition system of claim 1, wherein the compressed air aerosolizes the cellular sample provided by the nozzle.

10. The automated specimen deposition system of claim 1, wherein the design of the nozzle is configured at least in part based upon one or more of: cell type, cell concentration, and transport solution characteristics.

11. The automated specimen deposition system of claim 1, wherein a distance between the substrate and the nozzle is selected at least in part based upon one or more of: cell type, cell concentration, and transport solution characteristics.

12. The automated specimen deposition system of claim 1, wherein a pressure and/or a flow rate of the compressed air source is selected at least in part based upon one or more of: cell type, cell concentration, and transport solution characteristics.

13. The automated specimen deposition system of claim 1, further comprising:
a protective housing that creates an internal environment enclosing the removable spray cartridge.

14. The automated specimen deposition system of claim 13, further comprising:
an air system configured to partially recirculate air to control a humidity in the internal environment.

15. The automated specimen deposition system of claim 1, wherein the substrate is a microscope slide that is suitable for partial wave spectrometry analysis.

16. The automated specimen deposition system of claim 1, wherein the cellular sample is obtained using an incisional biopsy, a core biopsy, an excisional biopsy, a needle aspiration biopsy, a core needle biopsy, a stereotactic biopsy, an open biopsy, or a surgical biopsy.

* * * * *